United States Patent
Merlin et al.

(10) Patent No.: US 9,955,424 B2
(45) Date of Patent: Apr. 24, 2018

(54) METHODS AND APPARATUS FOR ENHANCED POWER SAVE PROTOCOL

(71) Applicant: QUALCOMM Incorporated, San Diego, CA (US)

(72) Inventors: Simone Merlin, San Diego, CA (US); Gwendolyn Denise Barriac, Encinitas, CA (US)

(73) Assignee: QUALCOMM Incorporated, San Diego, CA (US)

(*) Notice: Subject to any disclaimer, the term of this patent is extended or adjusted under 35 U.S.C. 154(b) by 170 days.

(21) Appl. No.: 14/963,055

(22) Filed: Dec. 8, 2015

(65) Prior Publication Data

US 2016/0183189 A1 Jun. 23, 2016

Related U.S. Application Data

(60) Provisional application No. 62/095,767, filed on Dec. 22, 2014.

(51) Int. Cl.
| | | |
|---|---|---|
| *G08C 17/00* | (2006.01) | |
| *H04W 52/02* | (2009.01) | |
| *H04W 74/00* | (2009.01) | |
| *H04W 28/06* | (2009.01) | |

(52) U.S. Cl.
CPC ... *H04W 52/0235* (2013.01); *H04W 52/0216* (2013.01); *H04W 52/0219* (2013.01); *H04W 28/06* (2013.01); *H04W 74/006* (2013.01); *Y02B 60/50* (2013.01)

(58) Field of Classification Search
CPC ............ H04W 28/06; H04W 52/0216; H04W 52/0219; H04W 52/0235; H04W 74/006; Y02B 60/50
See application file for complete search history.

(56) References Cited

U.S. PATENT DOCUMENTS

| | | | |
|---|---|---|---|
| 7,688,844 B2 | 3/2010 | Nishimura | |
| 7,796,545 B2 | 9/2010 | Surineni et al. | |
| 2005/0141543 A1 | 6/2005 | Nishimura | |
| 2007/0177549 A1* | 8/2007 | Lo | H04W 36/18 370/331 |
| 2011/0019555 A1 | 1/2011 | Gotoh et al. | |
| 2012/0188925 A1 | 7/2012 | Lee et al. | |
| 2014/0003414 A1* | 1/2014 | Choudhury | H04W 74/006 370/347 |

(Continued)

FOREIGN PATENT DOCUMENTS

| | | |
|---|---|---|
| EP | 1654837 A2 | 5/2006 |
| JP | 2011259432 A | 12/2011 |

(Continued)

OTHER PUBLICATIONS

International Search Report and Written Opinion—PCT/US2015/064769 ISA/EPO—dated Apr. 5, 2016.

*Primary Examiner* — Minh-Trang Nguyen
(74) *Attorney, Agent, or Firm* — Knobbe, Martens, Olson & Bear, LLP

(57) ABSTRACT

Methods and apparatus for enhanced power save protocol are provided. In one aspect, a message to two or more stations is transmitted, the message requesting the two or more stations to transmit buffered unit requests concurrently at a specified time. The buffered unit requests are then received concurrently from each of the stations.

32 Claims, 12 Drawing Sheets

(56) References Cited

U.S. PATENT DOCUMENTS

2014/0334368 A1 11/2014 Zhou et al.
2015/0009879 A1 1/2015 Kim et al.
2015/0036572 A1 2/2015 Seok
2015/0131508 A1 5/2015 Merlin et al.
2015/0282211 A1 10/2015 Zhang et al.
2015/0382283 A1 12/2015 Wang et al.

FOREIGN PATENT DOCUMENTS

| WO | WO-2007082235 | 7/2007 |
| WO | WO-2013070175 A1 | 5/2013 |
| WO | WO-2013078303 A1 | 5/2013 |
| WO | WO-2013122424 A1 | 8/2013 |

* cited by examiner

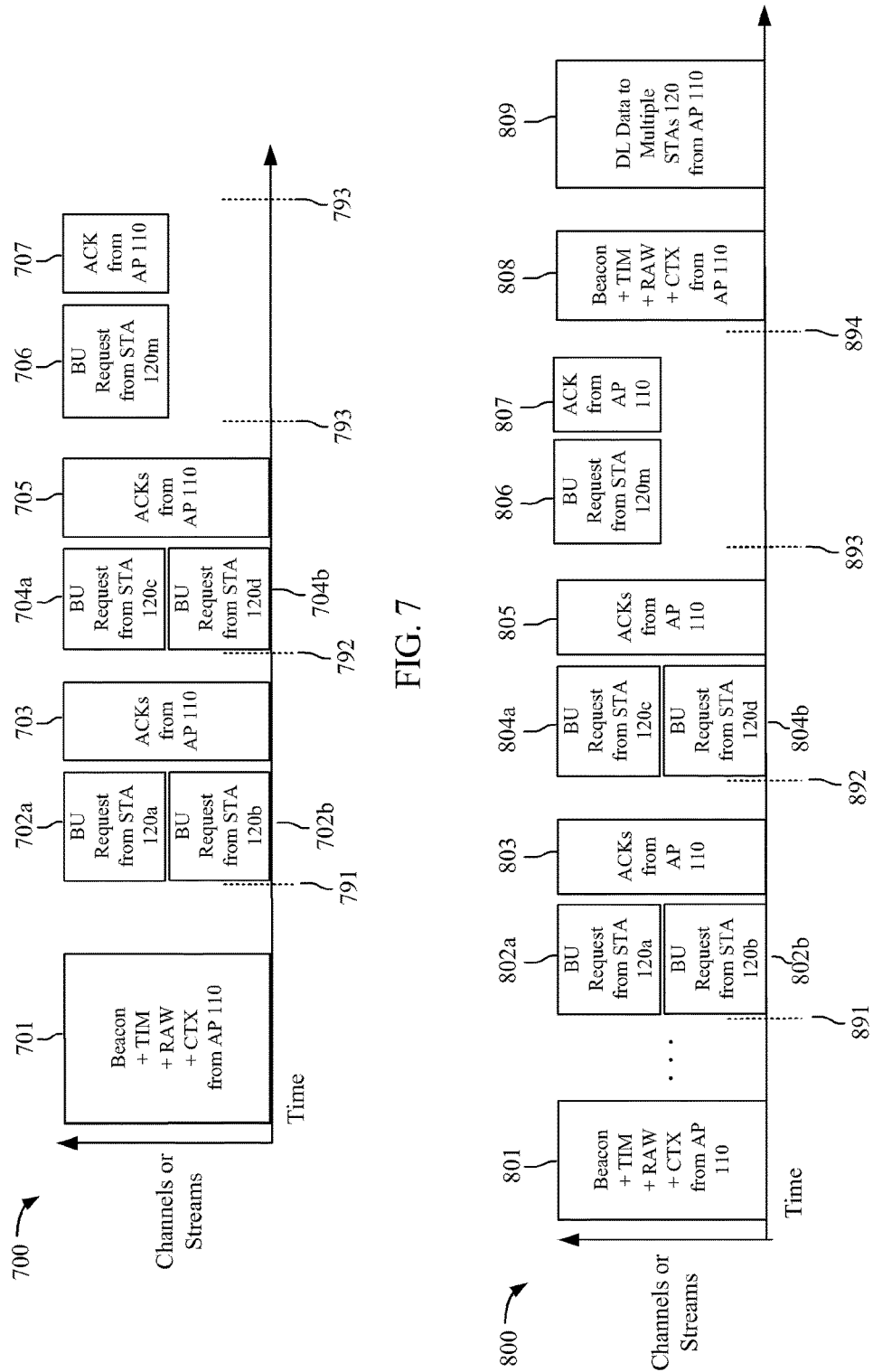

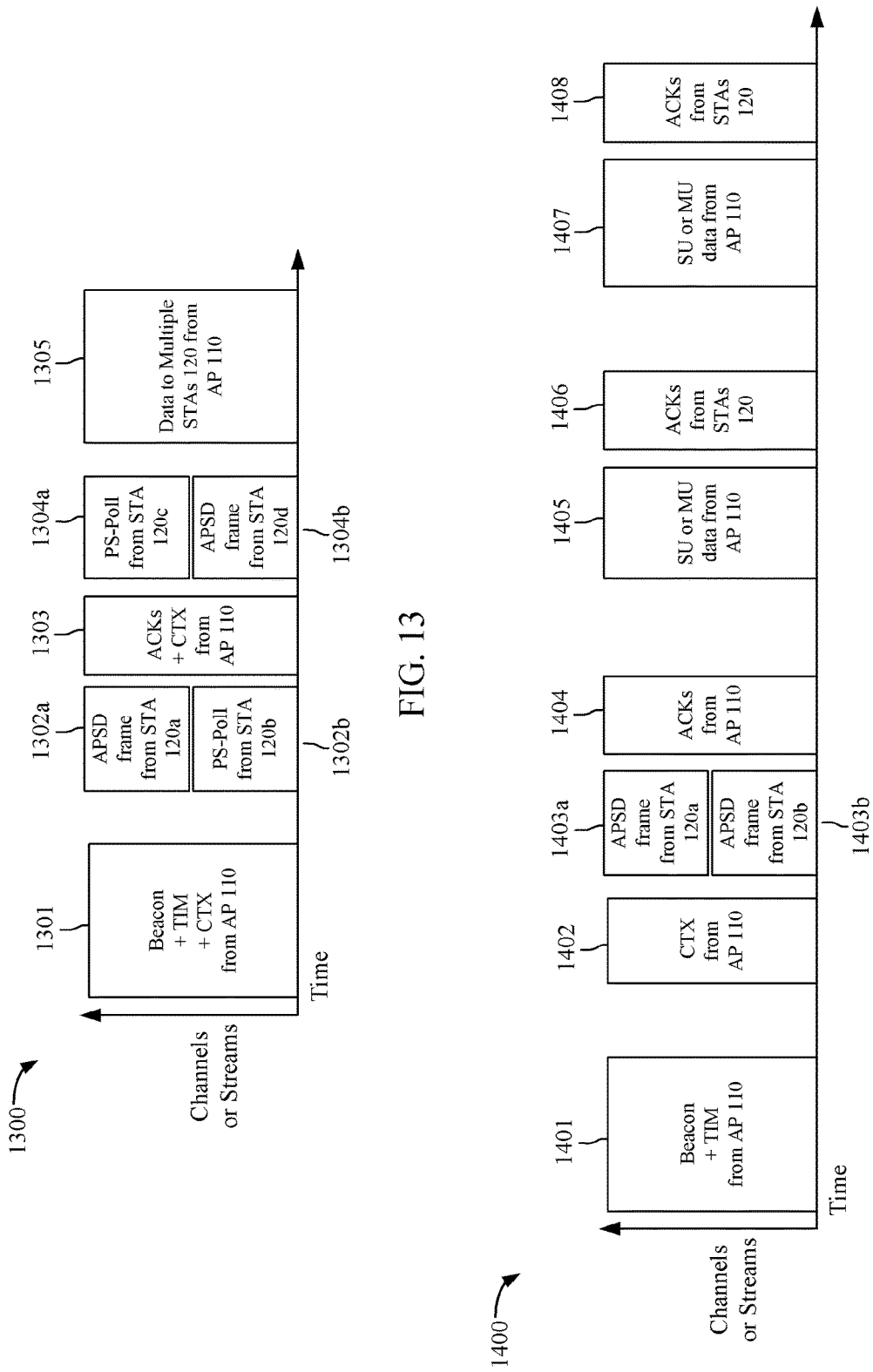

METHODS AND APPARATUS FOR ENHANCED POWER SAVE PROTOCOL

CROSS REFERENCE TO RELATED APPLICATIONS

This application claims priority to U.S. Provisional No. 62/095,767, titled "METHODS AND APPARATUS FOR ENHANCED POWER SAVE PROTOCOL," filed Dec. 22, 2014, which is hereby incorporated by reference in its entirety.

FIELD

Certain aspects of the present disclosure generally relate to wireless communications, and more particularly, to methods and devices for enhanced power save protocol.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple stations to communicate with a single access point by sharing the channel resources while achieving high data throughputs. With limited communication resources, it is desirable to reduce the amount of traffic passing between the access point and the multiple terminals. For example, when multiple terminals send buffered unit requests to the access point, it is desirable to minimize the amount of traffic to complete the uplink of the buffered unit requests. Thus, there is a need for an improved protocol for uplink of buffered unit requests from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

An apparatus for wireless communication is provided. The apparatus comprises a processing system configured to generate a request message for two or more devices to transmit automatic power save delivery frames concurrently at a particular time. The apparatus also comprises a first interface for outputting the request message for transmission to the two or more devices.

A method for wireless communication is provided. The method comprises generating a request message for two or more devices to transmit automatic power save delivery frames concurrently at a particular time. The method also comprises transmitting the request message to the two or more devices.

An apparatus for wireless communication is provided. The apparatus comprises means for generating a request message for two or more devices to transmit automatic power save delivery frames concurrently at a particular time. The apparatus also comprises means for transmitting the request message to the two or more devices.

A computer program product is provided. The computer program product comprises a computer readable medium encoded thereon with instructions that when executed cause an apparatus to perform a method of wireless communication. The method comprises generating a request message for two or more devices to transmit automatic power save delivery frames concurrently at a particular time. The method also comprises transmitting the request message to the two or more devices.

A wireless node for wireless communication is provided. The wireless node comprises at least one antenna. The wireless node also comprises a processing system configured to generate a request message for two or more devices to transmit automatic power save delivery frames concurrently at a particular time. The wireless node also comprises a transmitter circuit configured to transmit the request message to the two or more devices via the at least one antenna.

BRIEF DESCRIPTION OF THE DRAWINGS

FIG. 7 is a time sequence diagram of a buffered unit request procedure utilizing UL MU MIMO/UL FDMA and scheduling.

FIG. 8 is a time sequence diagram of a buffered unit request procedure utilizing UL MU MIMO/UL FDMA and scheduling.

FIG. 13 is a time sequence diagram of a buffered unit request procedure utilizing UL MU MIMO/UL FDMA and including both power save polling frames and automatic power save delivery frames.

FIG. 14 is a time sequence diagram of an automatic power save delivery procedure utilizing UL MU MIMO/UL FDMA.

DETAILED DESCRIPTION

Figure 1:
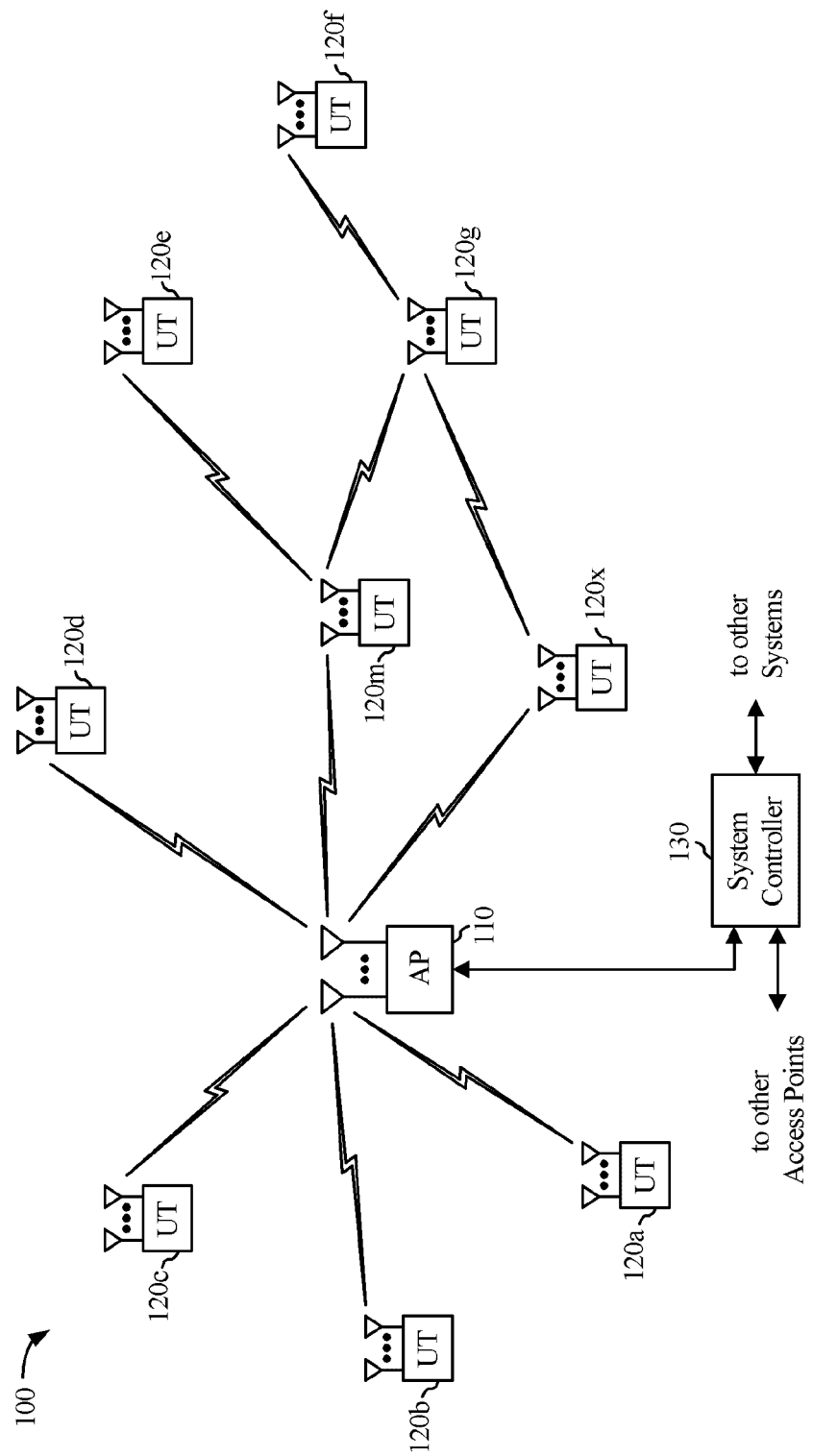
FIG. 1 illustrates a multiple-access multiple-input multiple-output (MIMO) system with access points and stations.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple stations. A TDMA system may allow multiple stations to share the same frequency channel by dividing the transmission signal into different time slots, each time slot being assigned to different station. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An AP may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An STA may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a system 100 employing multiple-access multiple-input multiple-output (MIMO) with access points and stations. For simplicity, only one access point 110 is shown in FIG. 1. An access point 110 is generally a fixed station that communicates with the stations 120 and may also be referred to as a base station or using some other terminology. A station 120 or STA 120 may be fixed or mobile and may also be referred to as a mobile station or a wireless device, or using some other terminology. The access point 110 may communicate with one or more stations 120 at any given moment on the downlink and uplink. The downlink (e.g., forward link) is the communication link from the access point 110 to the stations 120, and the uplink (e.g., reverse link) is the communication link from the stations 120 to the access point 110. A station 120 may also communicate peer-to-peer with another station 120. A system controller 130 couples to and provides coordination and control for the access point 110 and other access points (not shown).

While portions of the following disclosure will describe stations 120 capable of communicating via Spatial Division Multiple Access (SDMA), for certain aspects, the stations 120 may also include some stations 120 that do not support SDMA. Thus, for such aspects, the AP 110 may be configured to communicate with both SDMA and non-SDMA stations 120. This approach may conveniently allow older versions of stations 120 ("legacy" stations) that do not support SDMA to remain deployed in an enterprise, extending their useful lifetime, while allowing newer SDMA stations to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected stations 120 collectively represents the multiple-output for downlink transmissions and the multiple-input for uplink transmissions. For pure SDMA, it is desired to have $N_{ap} \geq K \geq 1$ if the data symbol streams for the K stations 120 are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected station 120 may transmit user-specific data to and/or receive user-specific data from the access point 110. In general, each selected station 120 may be equipped with one or multiple antennas (e.g., $N_{ut} \geq 1$). The K selected stations 120 can have the same number of antennas, or one or more stations 120 may have a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each station 120 may be equipped with a single antenna (e.g., in order to keep costs down) or multiple antennas (e.g., where the additional cost can be supported). The system 100 may also be a TDMA system if the stations 120 share the same frequency channel by dividing transmission/reception into different time slots, where each time slot may be assigned to a different station 120.

Figure 2:
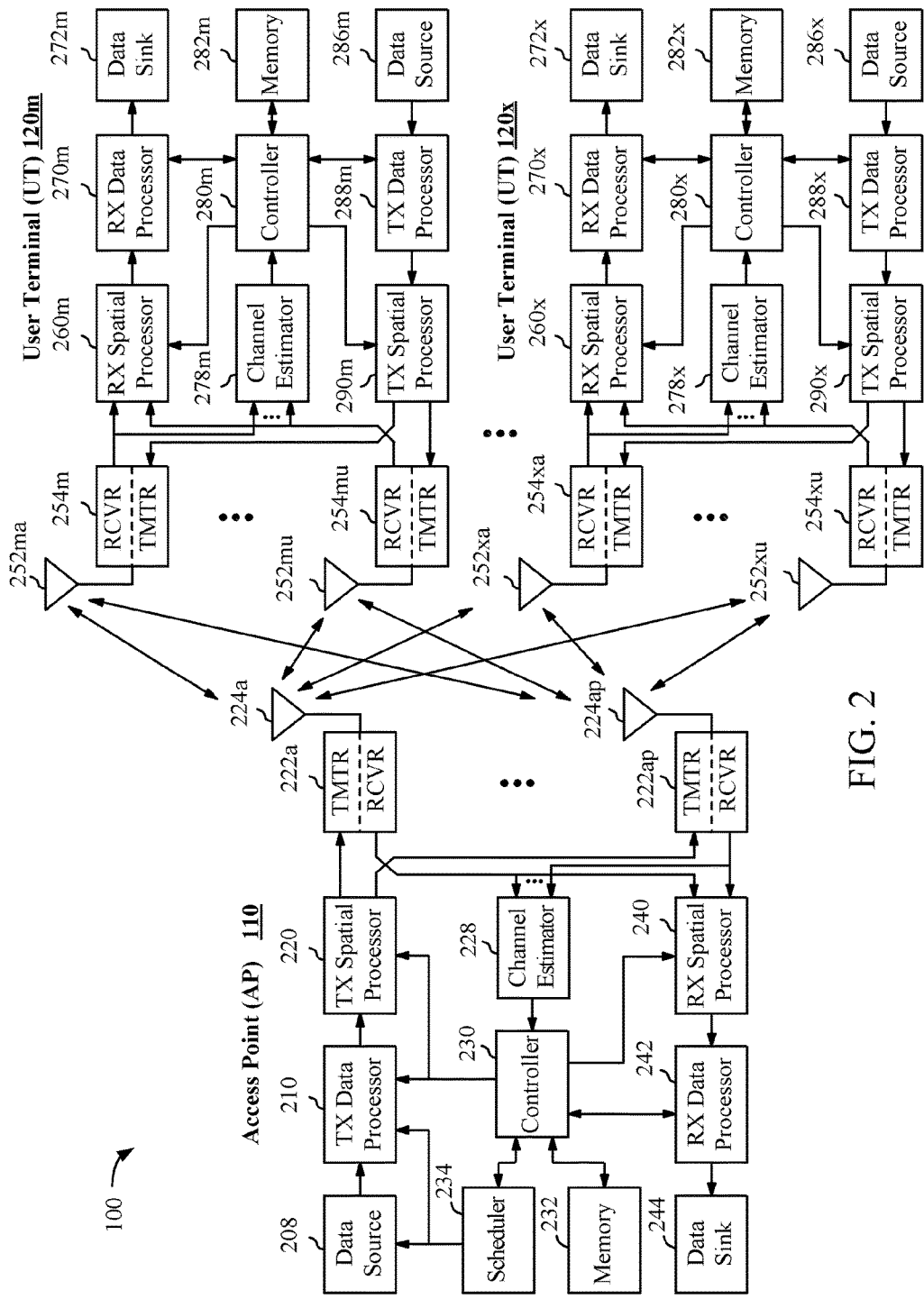
FIG. 2 is a block diagram of the access point and two stations and in a MIMO system.

FIG. 2 is a block diagram of the access point 110 and two stations 120m and 120x in system 100. The access point 110 is equipped with $N_t$ antennas 224a through 224ap. The station 120m is equipped with $N_{ut,m}$ antennas $252_{ma}$ through $252_{mu}$, and the station 120x is equipped with $N_{ut,x}$ antennas $252_{xa}$ through $252_{xu}$. The access point 110 is a transmitting entity for the downlink and a receiving entity for the uplink. The station 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ stations 120 are selected for simultaneous transmission on the uplink, and $N_{dn}$ stations 120 are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the station 120.

On the uplink, at each station 120 selected for uplink transmission, a TX data processor 288 receives traffic data from a data source 286 and control data from a controller 280. The TX data processor 288 processes (e.g., encodes, interleaves, and modulates) the traffic data for the station 120 based on the coding and modulation schemes associated with the rate selected for the station 120 and provides a data symbol stream. A TX spatial processor 290 performs spatial processing on the data symbol stream and provides $N_{ut,m}$ transmit symbol streams for the $N_{ut,m}$ antennas. Each combined receiver/transmitter unit (RCVR/TMTR) 254 receives and processes (e.g., converts to analog, amplifies, filters, and frequency upconverts) a respective transmit symbol stream to generate an uplink signal. $N_{ut,m}$ transmitter units of the RCVR/TMTR 254 provide $N_{ut,m}$ uplink signals for transmission from $N_{ut,m}$ antennas 252, for example to transmit to the access point 110.

$N_{up}$ stations 120 may be scheduled for simultaneous transmission on the uplink. Each of these stations 120 may perform spatial processing on its respective data symbol stream and transmit its respective set of transmit symbol streams on the uplink to the access point 110.

At the access point 110, $N_{up}$ antennas 224a through 224ap receive the uplink signals from all $N_{up}$ stations 120 transmitting on the uplink. Each antenna 224 provides a received signal to a respective receiver unit of a combined receiver/transmitter (TMTR/RCVR) 222. Each receiver unit of a TMTR/RCVR 222 performs processing complementary to that performed by transmitter unit of the RCVR/TMTR 254 and provides a received symbol stream. An RX (receiver) spatial processor 240 performs receiver spatial processing on the $N_{up}$ received symbol streams from $N_{up}$ receiver units of the TMTR/RCVR 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective station. An RX data processor 242 processes (e.g., demodulates, deinterleaves, and decodes) each recovered uplink data symbol stream in accordance with the rate used for that stream to obtain decoded data. The decoded data for each station 120 may be provided to a data sink 244 for storage and/or a controller 230 for further processing.

On the downlink, at the access point 110, a TX data processor 210 receives traffic data from a data source 208 for $N_{dn}$ stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each station 120 based on the rate selected for that station 120. The TX data processor 210 provides $N_{dn}$ downlink data symbol streams for the $N_{dn}$ stations. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit of a TMTR/RCVR 222 receives and processes a respective transmit symbol stream to generate a downlink signal. $N_{up}$ transmitter units of the TMTR/RCVR 222 may provide $N_{up}$ downlink signals for transmission from $N_{up}$ antennas 224, for example to transmit to the stations 120.

At each station 120, $N_{ut,m}$ antennas 252 receive the $N_{up}$ downlink signals from the access point 110. Each receiver unit of the RCVR/TMTR 254 processes a received signal from an associated antenna 252 and provides a received symbol stream. An RX spatial processor 260 performs receiver spatial processing on $N_{ut,m}$ received symbol streams from $N_{ut,m}$ receiver units of the RCVR/TMTR 254 and provides a recovered downlink data symbol stream for the station 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the station 120.

At each station 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each station typically derives the spatial filter matrix for the station based on the downlink channel response matrix $H_{dn,m}$ for that station. Controller 230 derives the spatial filter matrix for the access point based on the effective uplink channel response matrix $H_{up,eff}$. The controller 280 for each station may send feedback information (e.g., the downlink and/or uplink eigenvectors, eigenvalues, SNR estimates, and so on) to the access point 110. The controllers 230 and 280 may also control the operation of various processing units at the access point 110 and station 120, respectively.

Figure 3:
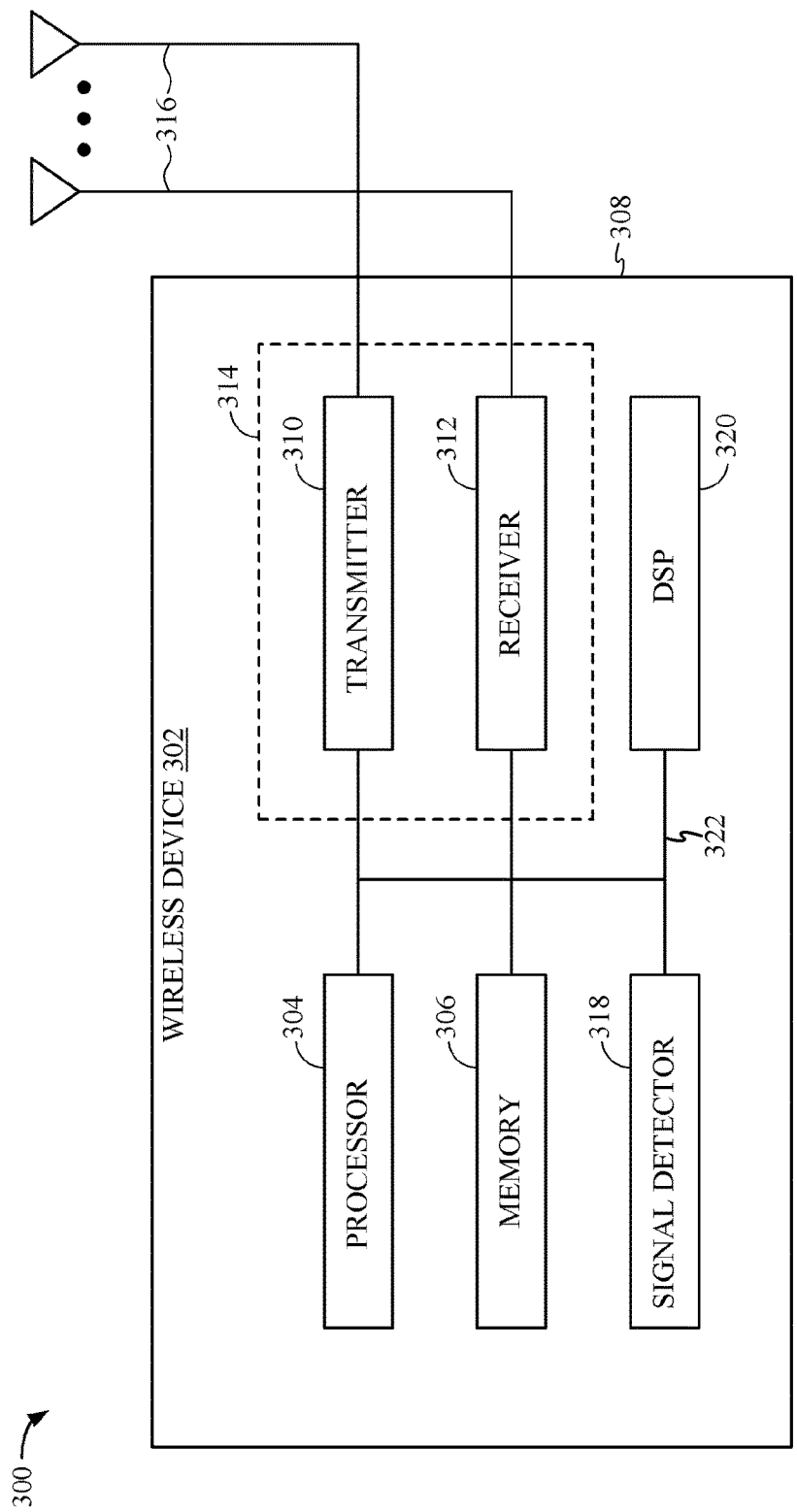
FIG. 3 illustrates various components that may be utilized in a wireless device that may be employed within a wireless communication system.

FIG. 3 illustrates various components that may be utilized in a wireless device 302 that may be employed within the system 100. The wireless device 302 is an example of a device that may be configured to implement the various methods described herein. The wireless device 302 may implement an access point 110 or a station 120.

The wireless device 302 may include a processor 304 which controls operation of the wireless device 302. The processor 304 may also be referred to as a central processing unit (CPU). The wireless device 302 may also include memory 306. The memory 306 may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. In some implementations, means for generating a request message may include the processor 304. In some implementations, means for generating a data message may include the processor 304.

The wireless device 302 may also include a housing 308 that may include a transmitter circuit 310 and a receiver circuit 312 to allow transmission and reception of data between the wireless device 302 and a remote location. The transmitter circuit 310 and the receiver circuit 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers. In some implementations, means for transmitting a request message may include the transmitter circuit 310. In some implementations, means for transmitting a data message may include the transmitter circuit 310. In some implementations, means for receiving may include the receiver circuit 312. In some implementations, means for receiving at least a portion of an Automatic Power Save Delivery (APSD) frame may include the receiver circuit 312.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support concurrently transmitting uplink (UL) buffered unit (BU) requests from multiple STAs 120 to an AP 110. In some embodiments, the UL BU request may be transmitted in a multi-user MIMO (MU MIMO) system (e.g., a multi-user MIMO transmission). Alternatively, the UL BU request may be transmitted in a multi-user FDMA (MU FDMA) or similar FDMA system (e.g., a multi-user FDMA transmission). Specifically, FIGS. 4-16 depict UL MU MIMO transmissions that would apply similarly to UL FDMA transmissions. In these embodiments, UL MU MIMO or UL FDMA transmissions can be sent simultaneously from multiple STAs 120 to an AP 110 and may create efficiencies in wireless communication. While FIGS. 4-16 show BU requests transmissions starting at the same time and ending at the same end time, concurrent transmission describes any transmission where at least a portion of a transmission from one wireless device is transmitted during an overlapping time with at least a portion of a transmission from another wireless device. For example, a first and second transmission may be concurrent with each other where the first transmission starts at a first time and overlaps in time with at least a portion of the second transmission which starts at a second time that is later than the first time. FIGS. 4-16 are exemplary time sequence diagrams showing data transfer between an AP 110 and multiple STAs 120. In FIGS. 4-16, the axis along the horizontal arrow represents time while the axis along the vertical arrow represents the multiple channels (e.g., bandwidths or sub-bands) or streams in a MU MIMO/FDMA configuration. The boxes represent data frames sent by a wireless device (e.g., an AP or an STA) while the dashed lines along the time axis represent time intervals, durations, or slots.

When an STA 120 has enabled power save mode (e.g., the STA 120 is "asleep") its antennas 252 or a portion thereof can be disabled to reduce power consumption. Consequently, the STA 120 may not be able to receive packets. In an aspect, the AP 110 will buffer the packets destined for each sleeping STA 120. Included in each beacon frame from the AP 110 is a traffic indication map (TIM) field. The TIM field can comprise a bitmap used to indicate that packets destined for a sleeping STA 120 are buffered at the AP 110. In certain implementations, the beacon frame includes a time at which the AP 110 will send a CTX frame to the STA 120. The STA 120 may wake up at certain intervals to receive beacon frames from AP 110 along with the TIM. The STA 120 may determine that the TIM indicates the STA's 120 association ID (AID) and the STA 120 may send a BU request frame to the AP 110 to request the AP 110 to send a buffered frame (e.g., including data stored by the AP 110 while the STA 120 was asleep) to the STA 120. The BU request frame may be any frame configured to trigger the AP 110 to transmit a buffered unit (e.g., buffered frame) to the requesting STA 120. For example, the BU request may comprise a power save poll (PS-Poll) or an Automatic Power Save Delivery (APSD) frame. Power save polls (PS-Polls) can comprise null data frames having a Power Management bit set to '1' within Frame Control field. Automatic Power Save Delivery (APSD) frames can comprise data frames having an Access Category field indicating that the STA 120 is awake and ready to receive data buffered at the AP 110. The BU request frame may comprise any frame that is configured to request a buffered unit from the AP 110.

As discussed above, the TIM can indicate which STAs 120 have frames buffered at the AP 110. The AP 110 may assign an AID to the STA 120 when the STA 120 associates with the AP 110. The AP 110 may assign each STA 120 a unique AID. Each bit in the TIM may correspond to traffic buffered for a specific STA 120 that the AP 110 is prepared to deliver. For example, bit number N in the TIM may indicate whether the AP 110 has traffic buffered to send to the STA 120 whose assigned AID is N or whose assigned AID otherwise corresponds to the Nth bit. As such, the TIM may include an order of stations based on an AID assigned to each STA 120 by the AP 110. For example, an STA 120 assigned a lower AID may come before an STA 120 assigned a higher AID value in the order of stations in the TIM. In some aspects, when one STA 120 disassociates with the AP 110, the AID may be reused later for another STA 120 at association.

In response to receiving the BU request, the AP 110 may send the first buffered frame to STA 120. The AP 110 may also indicate whether the AP 110 has more data buffered for the STA 120. In some aspects, if the STA 120 receives the indication of more data from the AP 110, and the STA 120 may continue to send BU requests to the AP 110 until the AP 110 no longer indicates that there is more data. At this point the STA 120 may return to power save mode. There is also the possibility that the AP 110 will have discarded the buffered packets destined for the STA 120. In this case the TIM will no longer indicate the station's AID and STA 120 may return to power save mode.

The various components of the wireless device 302 may individually or in combination with one or more other components provide a communications interface. One or more communications interfaces of the device 302, such as a first interface, and/or a second interface, may be configured to receive or transmit a message, such as a request or a reply message, by other components of the wireless device 302, such as the processor 304, transmitter circuit 310, receiver circuit 312, or the DSP 320. For example, the processor 304 may provide an interface by being operatively coupled to one or more signal lines for providing electrical signals to one or more other components of the wireless device 302, or the signal lines may be configured to provide electrical signals to components external to the wireless device 302. In some aspects, the transmitter circuit 310 may comprise an interface by transmitting radio signals over the antenna 316. Similarly the receiver circuit 312 may receive data over an interface by receiving electrical signals from the antenna 316.

Figure 4:
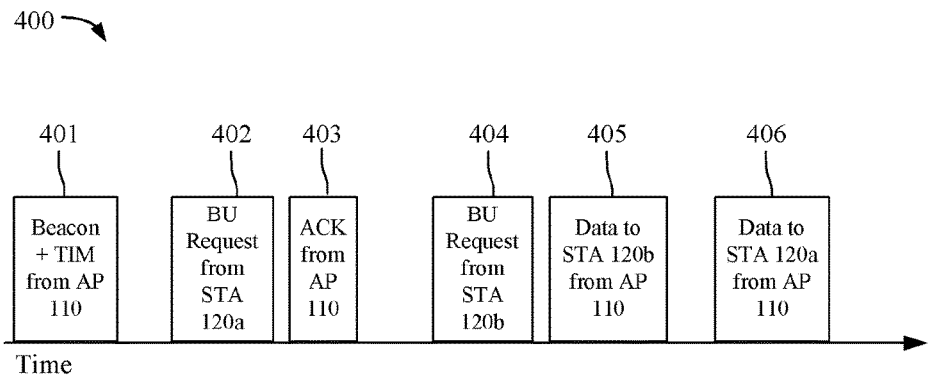
FIG. 4 is a time sequence diagram of a buffered unit request procedure in which uplink (UL) multi-user (MU) multiple-input multiple-output (MIMO)/UL frequency division multiple access (FDMA) is not implemented.

FIG. 4 is a time sequence diagram 400 of a buffered unit request procedure between an AP 110 and multiple STAs 120 not configured for UL MU MIMO or UL FDMA. In this procedure, the AP 110 sends a beacon frame 401 including a TIM field to all of the STAs 120. The TIM field may indicate that the AP 110 has traffic buffered to send to a first STA 120a and to a second STA 120b. The first STA 120a may receive the beacon frame 401 from the AP 110 and send a BU request frame 402 to the AP 110 in response. The AP 110 may respond to the received BU request from the first STA 120a by sending an acknowledgement ("ACK") frame 403. The second STA 120*b* may also receive the beacon frame 401 from the AP 110 and may send a BU request 404 to the AP 110 in response. Having received the BU requests 402 and 404 from the first and second STAs 120*a* and 120*b*, the AP may determine that the first and second STAs 120*a* and 120*b* are awake. The AP 110 may send data buffered for the second STA 120*b* to the second STA 120*b* in a data frame 405 and may subsequently send data buffered for the first STA 120*a* to the first STA 120*a* in a data frame 406. The result of this process is that each STA 120 sends its BU request separately, taking up additional airtime, and hence reducing overall network efficiency. A process in which the first and second STA 120 concurrently send their BU requests would reduce the overall transmission time and improve network efficiency.

Figure 5:
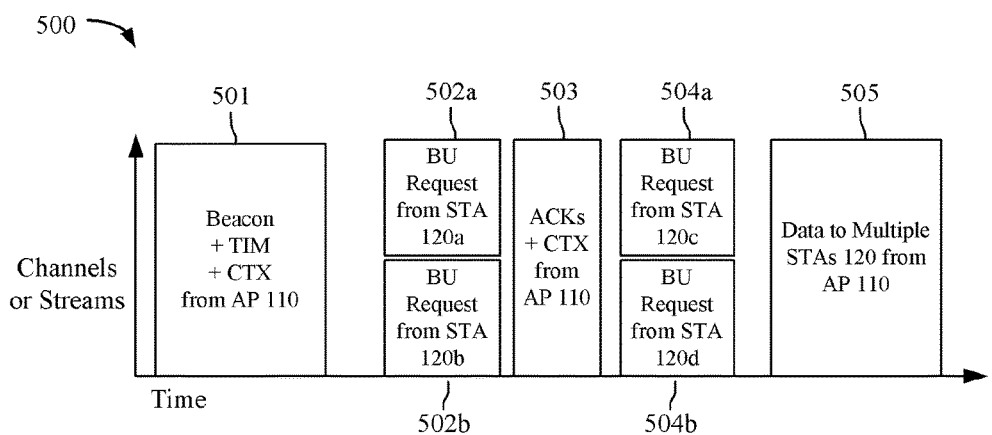
FIG. 5 is a time sequence diagram of a buffered unit request procedure utilizing UL MU MIMO/UL FDMA.

FIG. 5 is a time sequence diagram 500 of a buffered unit request procedure utilizing UL MU MIMO or UL FDMA to improve network efficiency. The buffered unit request procedure of FIG. 5 may be performed in the system 100 described above. In this procedure, the AP 110 may transmit a beacon 501 including a TIM field and a clear-to-transmit frame (CTX). The TIM may indicate that the AP 110 has buffered data to send to a first STA 120*a*, a second STA 120*b*, a third STA 120*c*, and a fourth STA 120*d*, for example. The beacon 501 provides UL MU MIMO or UL FDMA parameters for the STAs 120 that are indicated in the TIM field as having DL (downlink) data pending at the AP 110. In this procedure, the CTX element may indicate that the first STA 120*a* and the second STA 120*b* are clear to transmit. In response to receiving the CTX from the AP 110, the first STA 120*a* and the second STA 120*b* may use the UL MU MIMO/UL FDMA parameters provided in the CTX field of the beacon 501 to transmit their BU requests 502*a* and 502*b* concurrently, on different streams or channels, according to the CTX. For example, the first STA 120*a* transmits during a first time period and the second STA 120*b* transmits during a second time period, such that the first time period and the second time period overlap. In this procedure, the beacon 501 including the CTX element acts as a trigger for the first STA 120*a* and the second STA 120*b* to send their BU requests 502*a* and 502*b*. The AP 110 may respond to the BU requests 502*a* and 502*b* by sending an ACK frame 503 to the first and second STAs 120*a* and 120*b* either in DL MU MUMO, DL FMDA, or as a multicast ACK frame.

As described above, the AP 110 may also have data buffered to send to the third STA 120*c* and the fourth STA 120*d*. The AP 110 may use the ACK frame 503 to trigger a set of UL MU MIMO or UL FMDA BU requests from the third and fourth STAs 120. For example, the AP 110 may include a CTX element in the ACK frame 503. The CTX element in the ACK frame 503 may clear the third and fourth STAs 120*c* and 120*d* to transmit. The UL MU MIMO or UL FDMA parameters for the third and fourth STAs 120*c* and 120*d* may have been previously defined in the beacon 501 as described above. Alternatively, the ACK frame 503 including the CTX field may further include the required parameters for MU MIMO or FDMA transmissions. In response to receiving the ACK 503 including the CTX field, the third and fourth STAs 120*c* and 120*d* may concurrently transmit their BU requests 504*a* and 504*b* to the AP 110 using UL MU MIMO/UL FDMA according to the CTX. In response to receiving the BU requests 502*a*, 502*b*, 504*a*, and 504*b* from the first, second, third, and fourth STAs 120*a-d*, the AP may determine that the STAs 120*a-d* are awake and the AP 110 may send DL data to multiple STAs 120. For example, the AP 110 may respond to each of the BU requests 502*a*, 502*b*, 504*a*, and 504*b* from the first, second, third, and fourth STAs 120*a-d* directly with data frames 505. The AP 110 may send the data frames 505 to each STA 120*a-d* using either DL single-user (SU) or MU transmissions. As shown in FIG. 5, both the beacon 501 and the DL ACK 503 sent by the AP 110 may serve as a trigger for a UL MU MIMO/UL FDMA transmission for particular stations. Furthermore, in some embodiments, any DL packet from the AP 110 can serve as the trigger for a UL MU MIMO/UL FDMA transmission by including the CTX element.

The UL MU MIMO/UL FDMA configuration depicted in FIG. 5 has advantages not provided by the configuration of FIG. 4. As shown in FIG. 5, by utilizing UL MU MIMO or UL FDMA, multiple STAs 120 can transmit BU requests concurrently. This reduced the amount of time needed for STAs 120 to send their BU requests.

Figure 6A:
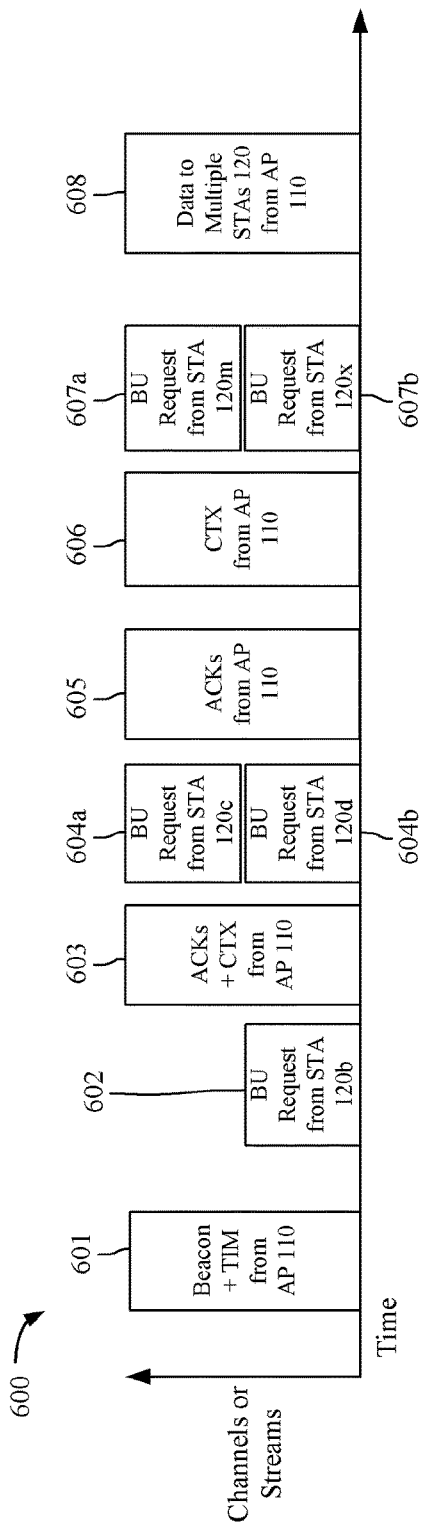
FIG. 6A is a time sequence diagram of a buffered unit request procedure utilizing UL MU MIMO/UL FDMA.

FIG. 6A is a time sequence diagram 600 of a buffered unit request procedure utilizing UL MU MIMO or UL FDMA to improve network efficiency. The buffered unit request procedure of FIG. 6A may be performed in the MIMO system 100 described above. In this procedure, an AP 110 may send a beacon frame 601 including a TIM. The TIM may indicate that the AP 110 has buffered data to send to a first STA 120*a*, a second STA 120*b*, a third STA 120*c*, a fourth STA 120*d*, a fifth STA 120*m*, and a sixth STA 120*x*. The first STA 120*a* may be in power save mode and may not receive the beacon frame 601. The second STA 120*b* may receive the beacon frame 601 from the AP 110 and may determine from the TIM field that the AP 110 has data pending for the second STA 120*b*. The second STA 120*b* may send a BU request frame 602 to the AP in response to determining whether the AP 110 has data pending for the second STA 120*b*. The BU requests described herein may be transmitted with a short interframe space (SIFS), without using contention. In this procedure, the beacon frame 601 may not provide UL MU MIMO/UL FDMA parameters (e.g., in a CTX element). As such, the second STA 120*b* transmits the BU request frame 602 in a non-multiple access format. The AP 110 may receive the BU request frame 602 from the second STA 120*b* and may respond with an ACK frame 603 including a CTX element. ACKs sent by the AP 110 in response to a BU request (e.g., ACK frame 603) may be transmitted with SIFS, without contention. The CTX element in the ACK frame 603 may clear the third STA 120*c* and the fourth STA 120*d* to transmit their BU requests. The ACK frame 603 including the CTX acts as a trigger for UL MU MIMO/UL FDMA transmission from the third and fourth STAs 120*c* and 120*d*. The ACK frame 603 may also include UL MU MIMO/UL FDMA parameters. The third and fourth STAs 120*c* and 120*d* may receive the ACK frame 603 and, in response, may concurrently transmit BU requests 604*a* and 604*b*, respectively, according to the CTX. The AP 110 may receive the BU requests 604*a* and 604*b* and may respond by sending an ACK frame 605.

As described above, the AP 110 may also have data pending for the fifth STA 120*m* and the sixth STA 120*x*. The AP 110 may transmit a CTX frame 606 to fifth and sixth STAs 120*m* and 120*x*. The CTX frame 606 is not included in a beacon frame or an ACK frame, but rather is sent as a stand-alone frame. As described above, the CTX may be sent in any DL transmission from the AP 110. The CTX frame 606 may be sent either with SIFS or with backoff contention. The CTX frame 606 may act as a trigger for the fifth STA 120*m* and the sixth STA 120*x* to concurrently transmit BU requests 607*a* and 607*b*, respectively. The AP 110 may receive the BU requests 607*a* and 607*b*. The AP 110 may respond to all, or some, of the BU requests 602, 604*a*, 604*b*, 607*a*, and 607*b*, from the STAs 120*a-d*, 120*m*, and 120x by sending at least one data frame 608 (or message) including the buffered data for the STAs 120a-d, 120m, and 120x. The AP 110 may send data to each STA 120 using either DL single-user (SU) or MU transmissions.

Figure 6B:
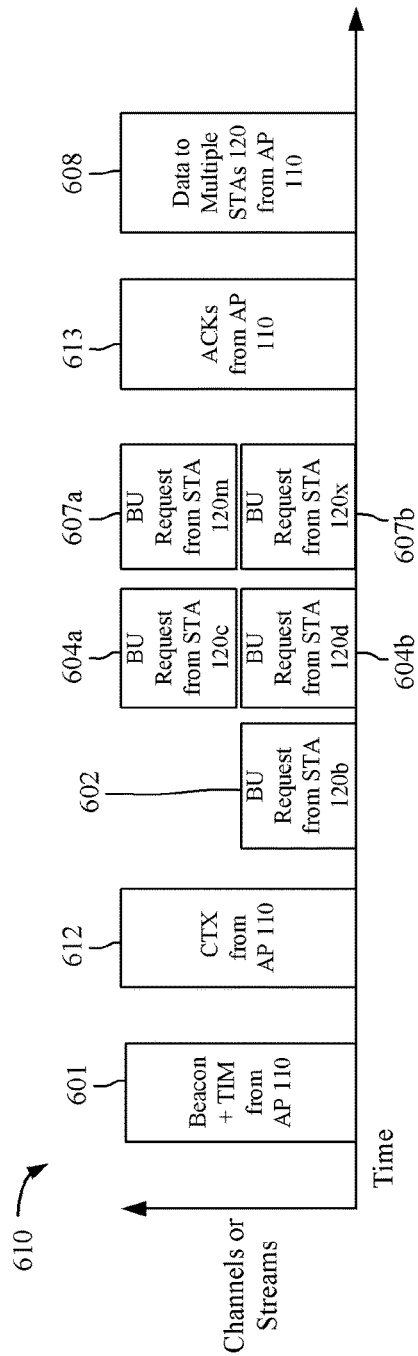
FIG. 6B is a time sequence diagram of a buffered unit request procedure utilizing UL MU MIMO/UL FDMA.

FIG. 6B is a time sequence diagram 610 of a buffered unit request procedure utilizing UL MU MIMO or UL FDMA to improve network efficiency. The procedure in FIG. 6B is similar to that described above with reference to FIG. 6A. One difference between the procedure shown in FIG. 6B and the procedure shown in FIG. 6A is that in FIG. 6B, the AP 110 may transmit a CTX frame 612 to the STAs 120 after transmitting the beacon frame 601. In certain implementations, the beacon frame 601 includes an information element (IE) indicating when the AP 110 will send the CTX frame 612. STAs 120 indicated by the TIM to have buffered data at the AP 110 will read the IE and wait for the time indicated in the beacon frame 601 to receive the CTX frame 612. The CTX frame 612 may provide UL MU MIMO/UL FDMA parameters and may clear the STAs 120a-c, 120m, and 120x to transmit their BU requests. As such, the CTX frame 612 acts as a trigger for transmission of the BU request frame 602 from STA 120b, the BU request 604a from STA 120c, the BU request 604b from STA 120d, the BU request 607a from STA 120m, and the BU request 607b from STA 120x. The AP 110 may respond to the BU requests from the STAs 120 by transmitting ACKs 613 to the STAs 120. The AP 110 may then transmit data frames 608 to multiple STAs 120.

In the procedures described above with reference to FIGS. 6A and 6B, the AP 110 may transmit additional CTX frames to the STAs 120 to trigger further UL MU MIMO BU requests from the STAs 120. The AP 110 may transmit the additional CTX frames within the same transmission opportunity as the CTX frame 612 or the AP 110 may perform contention access to transmit the additional CTX frames. The STAs 120 may also perform contention access to transmit their BU requests, which may conflict with the operation of the AP 110 (e.g., a CTX frame transmitted by the AP 110 may collide with a BU request transmitted by an STA 120). When frames are sent with contention, a collision may occur. By contrast, when frames are sent with SIFS, a collision may not occur. In order to reduce the collision probability and improve network efficiency, the STAs 120 may have a lower priority in accessing the wireless network medium compared to the AP 110. For example, the wireless network medium may be reserved so that only the AP 110 can access the medium or the STAs 120 may be provided with lower priority contention parameters (e.g., arbitration inter-frame spacing number or minimum contention window parameters).

FIG. 7 is a time sequence diagram 700 of a buffered unit request procedure utilizing UL MU MIMO/UL FDMA and restricted access window (RAW) information to improve network efficiency. The buffered unit request procedure of FIG. 7 may be performed in the MIMO system 100 described above. In this procedure, an AP 110 may transmit a beacon frame 701 including a TIM, a RAW element, and a CTX. The TIM may indicate that the AP 110 has buffered data to send to a first STA 120a, a second STA 120b, a third STA 120c, a fourth STA 120d, a fifth STA 120m, and a sixth STA 120x. The RAW element may define windows or slots of time where certain STAs 120 cannot transmit, thereby enabling the AP 110 to create scheduled time slots in which certain other STAs 120 can transmit. In this configuration the STAs 120 transmit based on their time slot instead of transmitting based on a distance from a previous packet. The STAs 120 determine which time slot they may transmit during based upon a schedule, indicated by the RAW, included in the beacon frame 701. The dotted lines along the time axis in FIG. 7 indicate the time slot windows as indicated in the beacon frame 701. In other embodiments, the AP may set the network allocation vector (NAV) to define the scheduled time slots for each STA 120. The AP may set the NAV in the beacon 702 or in another frame sent immediately after the beacon frame 701. The STAs 120 that are scheduled for transmission in the CTX may ignore the NAV setting. The NAV setting may provide a schedule for STAs 120 (e.g., legacy STAs) that do not support SDMA. As such, this operation mode may provide protection and priority with respect to STAs that do not support SDMA.

The beacon frame 701 defines a schedule in which the first STA 120a and the second STA 120b will transmit during a first time slot starting at time 791 and ending at time 792. The schedule also indicates that the third STA 120c and the fourth STA 120d will transmit during a second time slot starting at time 792 and ending at time 793. The schedule also indicates that the fifth STA 120m will transmit during a third time slot starting at time 793 and ending at time 794. The AP 110 may provide MU MIMO/FDMA parameters for all of the STA 120 in the CTX element included in the beacon frame 701. According to the schedule indicated in the beacon frame 701, the first STA 120a and the second STA 120b may transmit their BU requests 702a and 702b to the AP 110 during the first time slot using UL MU MIMO/ UL FDMA parameters indicated in the beacon frame 701. The AP 110 may responds to the BU requests 702a and 702b with ACK frames 703. According to the schedule indicated in the beacon frame 701, the third STA 120c and the fourth STA 120d may concurrently transmit BU requests 704a and 704b using UL MU MIMO/UL FDMA according to the CTX. The AP 110 may respond to the BU requests 704a and 704b with ACK frames 705. According to the schedule indicated in the beacon frame 701, the fifth STA 120m may transmit a BU request 706, which does not overlap in time with a BU request from any other station. For example, at least a portion of the BU request 706 is not transmitted over an overlapping time with transmission of at least a portion of another BU request. The sixth STA 120x may have been scheduled to transmit with the fifth STA 120m, but the sixth STA 120x may not be awake and may not have received the beacon frame 701. The AP 110 may receive the BU request 706 from the fifth STA 120m and may respond with an ACK frame 707. As shown in FIG. 7, the schedule defined by the beacon frame 701 may improve network efficiency by scheduling concurrent transmission of BU requests. The schedule improves network efficiency because a DL transmission from the AP 110 containing a CTX is not required to trigger the transmission of MU MIMO/FDMA BU requests. This configuration reduces possible delays that might be incurred if the CTX is not received by an STA 120 for whatever reason. Scheduling may also be useful where the ability of stations to send BU requests independently has been disabled.

FIG. 8 is a time sequence diagram 800 of a buffered unit request procedure utilizing UL MU MIMO/UL FDMA and scheduling of BU requests to improve network efficiency. The buffered unit request procedure of FIG. 8 may be performed in the MIMO system 100 described above. The AP 110 may transmit a beacon frame 801 including a TIM, a RAW, and a CTX element. The TIM may indicate that the AP 110 has buffered data to send to a first STA 120a, a second STA 120b, a third STA 120c, a fourth STA 120d, a fifth STA 120m, and a sixth STA 120x. As shown in FIG. 8, the schedule defined by the RAW in the beacon frame 801 may set the STAs 120a-d, 120m, and 120x to transmit their BU requests in time slots which are immediately before a subsequent beacon frame 808. The RAW element may indicate a schedule for the first STA 120*a* and the second STA 120*b* to concurrently transmit BU requests 802*a* and 802*b*, respectively, in a first time slot, starting at time 891 and ending at time 892, according to the UL MIMO/UL FDMA parameters set in the beacon frame 801. The AP 110 may receive the BU requests 802*a* and 802*b* and respond by transmitting ACKs 803. In a second time slot starting at time 892 and ending at time 893, the third STA 120*c* and the fourth STA 120*d* may concurrently transmit BU requests 804*a* and 804*b*, respectively, to the AP 110 according to the schedule indicated in the RAW element. The AP 110 may respond to the BU requests 804*a* and 804*b* with ACKs 805. During a third time slot starting at time 893 and ending at time 894, the fifth STA 120*m* may transmit BU request 806 to the AP 110 and the AP 110 responds with ACK 807. The sixth STA 120*x* may have been identified in the TIM as having data pending at AP 110 and may have been scheduled to transmit a BU request during the third time slot concurrently with the fifth STA 120*m*. However, the sixth STA 120*x* may have been sleeping and may not have received the beacon frame 801. As such, the sixth STA 120*x* may not send a BU request to the AP 110 during the third time slot.

The procedure of FIG. 8 is beneficial because scheduling the STAs 120 to send their BU requests just before the next beacon frame 808 allows the AP 110 to know which STAs 120 are sleeping so that the AP 110 will not address the sleeping STAs 120 in that beacon frame 808. As shown in FIG. 6A, since the sixth STA 120*x* was sleeping and did not receive the beacon frame 801, the AP 110 may not schedule the sixth STA 120*x* in the subsequent beacon frame 801. One benefit this configuration provides is that the AP 110 is able to address stations that it knows are awake and can delay addressing stations that it knows are asleep, thereby improving network efficiency since the sleeping STAs 120 are not scheduled in time slots that they will not use. This configuration also allows the TIM field of the subsequent beacon frame 808 to be shorter since it will not address the STAs 120 known to be sleeping.

As described above, the RAW element of the beacon may be used to define a schedule. In addition, the TIM bitmap may be used instead to implicitly schedule stations according to their position in the TIM. In one example implicit scheduling scheme, the first station listed in the TIM may use the first channel/stream, the second station listed in the TIM may use the second channel/stream, and so on. However, the implicit schedule may be determined in any appropriate manner based on the TIM bitmap. When a channel/stream for a particular time slot becomes full the remaining stations that need to transmit BU requests may use subsequent time slots that are not full.

Figure 9:
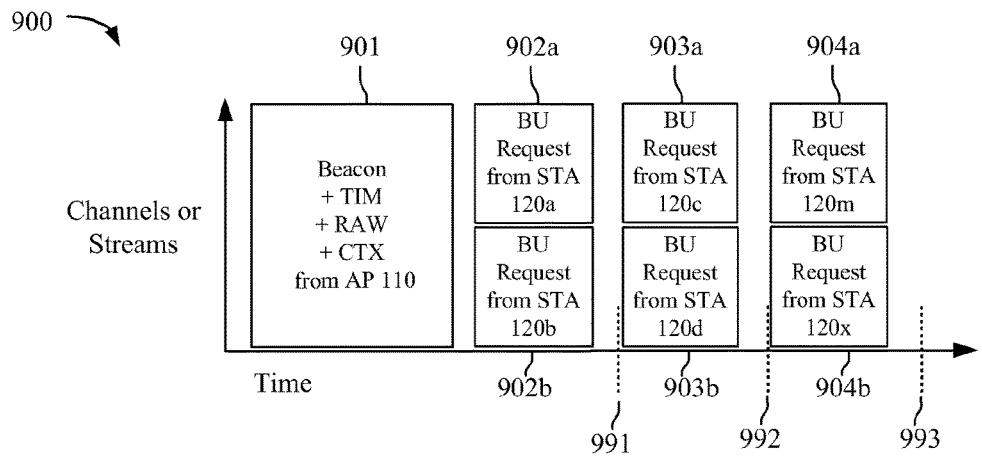
FIG. 9 is a time sequence diagram of a buffered unit request procedure utilizing UL MU MIMO/UL FDMA and implicit scheduling.

FIG. 9 is a time sequence diagram 900 of a buffered unit request procedure using implicit scheduling based on a TIM. The buffered unit request procedure of FIG. 9 may be performed in the MIMO system 100 described above. The AP 110 may transmit a beacon frame 901 including a TIM, a RAW, and a CTX element. A bitmap of the TIM may indicate, in order, that the AP 110 has buffered data to send to a first STA 120*a*, a second STA 120*b*, a third STA 120*c*, a fourth STA 120*d*, a fifth STA 120*m*, and a sixth STA 120*x*. The six STAs 120*a-d*, 120*m*, and 120*x* may determine an implicit schedule based on the TIM. The STAs 120 may determine their order in the BU requesting schedule based on their order in the TIM. The beacon frame 901 may schedule the first STA 120*a* and the second STA 120*b* to concurrently transmit their BU requests 902*a* and 902*b* immediately after receiving the beacon frame 901. The implicit schedule may set the third STA 120*c* and the fourth STA 120*d* to concurrently transmit their BU requests 903*a* and 903*b* in a first time slot starting at time 991 and ending at time 992. The implicit schedule may set the fifth STA 120*m* and the sixth STA 120*x* to concurrently transmit their BU requests 904*a* and 904*b* in the subsequent time slot starting at time 992 and ending at time 993. A RAW field may still be included in the beacon frame 901 to silence other STAs while the schedules STAs send their BU requests. A CTX element included in the beacon frame 901 may be used to delineate the parameters needed for UL MU MIMO/UL-FDMA transmission. The timing and number of STAs scheduled to transmit BU request messages may either be indicated in a schedule provided by the beacon frame or may be predetermined.

Figure 10:
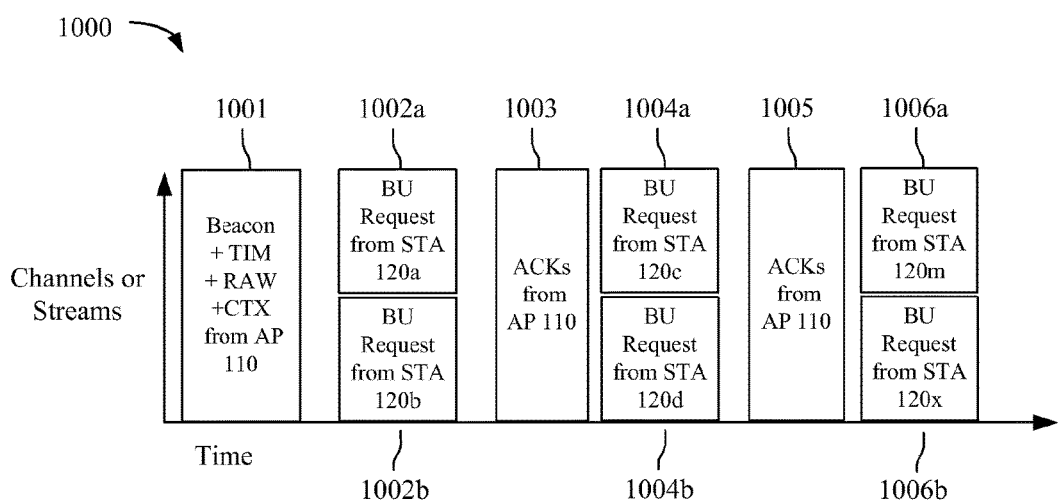
FIG. 10 is a time sequence diagram of a buffered unit request procedure utilizing UL MU MIMO/UL FDMA, downlink triggers, and implicit scheduling.

FIG. 10 is a time sequence diagram 1000 of a buffered unit request procedure using both DL triggers and implicit scheduling. The buffered unit request procedure of FIG. 10 may be performed in the MIMO system 100 described above. The AP may transmit a beacon frame 1001 including a TIM, a RAW, and a CTX element. The TIM may indicate an implicit schedule that does not correspond to exact time slots, but rather to an ordering of groups of stations which are triggered by DL packets. The TIM may indicate that the AP 110 has buffered data to send to a first STA 120*a*, a second STA 120*b*, a third STA 120*c*, a fourth STA 120*d*, a fifth STA 120*m*, and a sixth STA 120*x*. The RAW may be used to silence STAs not scheduled to send BU requests and the CTX element may include UL-MU-MIMO/UL FDMA parameters to be used by the STAs. The CTX element in the beacon frame 1001 may acts as a trigger for the first STA 120*a* to send its BU request 1002*a* and for the second STA to send its BU request 1002*b* to the AP 110. The AP 110 may respond to the BU requests 1002*a* and 1002*b* by sending an ACK frame 1003. The ACK frame 1003 may act as a trigger for the third STA 120*c* to send its BU requests 1004*a* and for the fourth STA 120*d* to send its BU request 1004*b*. The AP 110 may respond to the BU requests 1004*a* and 1004*b* with an ACKs frame 1005. The ACKs frame 1005 may act as a trigger for the fifth STA 120*m* and the sixth STA 120*x* to transmit their BU requests 1006*a* and 1006*b*, respectively. As described above, the ACK from the AP 110 to certain STAs may be used to trigger BU requests from other STAs.

Figure 11:
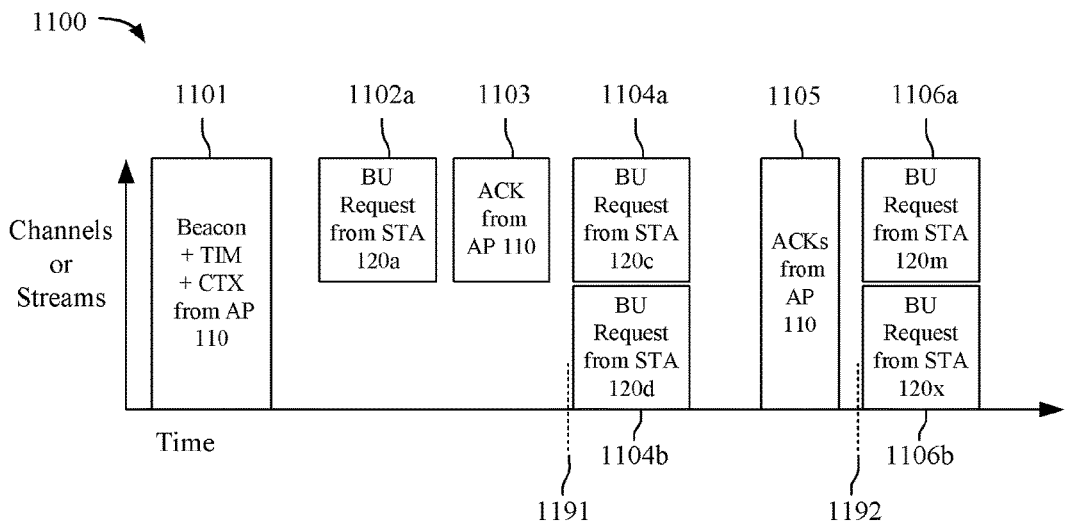
FIG. 11 is a time sequence diagram of a buffered unit request procedure utilizing UL MU MIMO/UL FDMA and implicit scheduling.

FIG. 11 is a time sequence diagram 1100 of a buffered unit request procedure using implicit scheduling based on a TIM. The buffered unit request procedure of FIG. 11 may be performed by the MIMO system 100 described above. The AP 110 may transmit a beacon frame 1101 including a TIM and a CTX element. The TIM may indicate that the AP 110 has buffered data to send to a first STA 120*a*, a second STA 120*b*, a third STA 120*c*, a fourth STA 120*d*, a fifth STA 120*m*, and a sixth STA 120*x*. As described above, the TIM may include an order of stations. For example, the order of stations may be based on an AID assigned to each STA 120 by the AP 110. The STAs 120 may be configured to implicitly schedule time slots for transmitting BU requests based on the order of stations in the TIM. For example, an STA 120 having a lower AID may schedule a time slot for transmitting it BU request before a STA 120 having a higher AID. The second STA 120*b* may be listed in the TIM but it may be asleep and may not receive the beacon frame 1101. The beacon frame 1101 may trigger the first STA 120*a* to immediately transmit its BU request 1102*a* while the second STA 120*b* may not send its BU request. The AP 110 may respond to the BU request 1102*a* with an ACK 1103 that does not act as a trigger for the transmission of BU requests.

Instead, the TIM implicitly schedules the third STA 120c and the fourth STA 120d to transmit BU requests 1104a and 1004b, respectively, in a first time slot starting at time 1191 and ending at time 1192. The AP 110 may respond to the received BU requests 1104a and 1104b with ACKs 1105 that does not act as a trigger for BU request transmission. The TIM may indicate a second time slot, starting at time 1192, in the implicit schedule. The fifth STA 120m and the sixth STA 120x are triggered by the implicit schedule to concurrently transmit their BU requests 1106a and 1106b, respectively, during the second time slot at time 1192. The beacon frame 1101 may also include a RAW element configured to silence non-scheduled STAs, and the beacon frame 1101 may use the CTX element to indicate parameters for the UL MU MIMO/UL FDMA transmission of BU requests.

Figure 12:
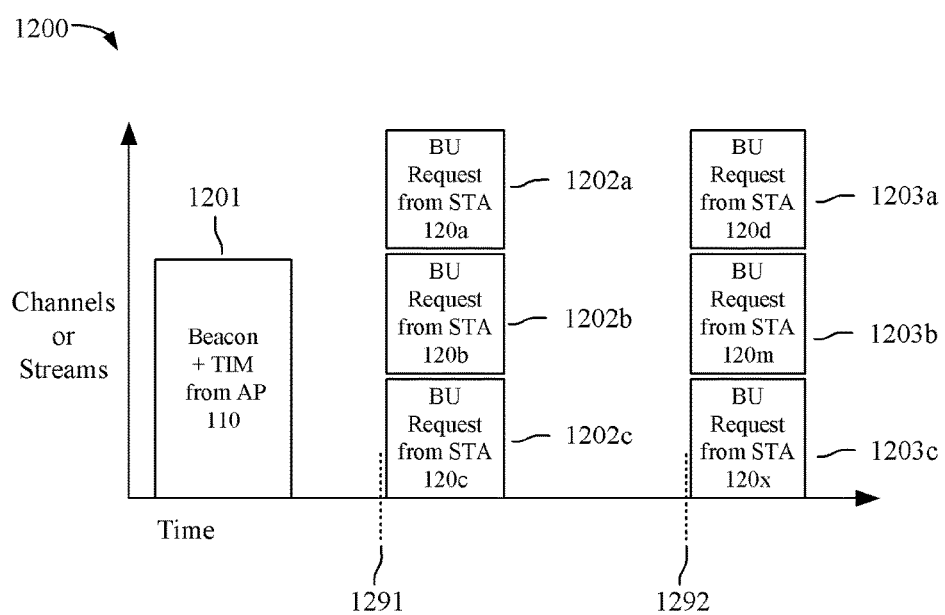
FIG. 12 is a time sequence diagram of a buffered unit request procedure utilizing UL MU MIMO/UL FDMA and implicit scheduling.

FIG. 12 is a time sequence diagram 1200 of a buffered unit request procedure using implicit scheduling based on a TIM. The buffered unit request procedure of FIG. 12 may be performed in the MIMO system 100 described above. The AP 110 may transmit a beacon frame 1201 including a TIM. The TIM may indicate that the AP 110 has buffered data to send to a first STA 120a, a second STA 120b, a third STA 120c, a fourth STA 120d, a fifth STA 120m, and a sixth STA 120x. The AP 110 may be configured to have 80 MHz total bandwidth and a bandwidth chunk size may be 20 MHz or less. This configuration allows three stations to transmit concurrently using UL FDMA since the three combined 20 MHz or less bandwidth chunk sizes are less than the 80 MHz total bandwidth. An implicit schedule set by the TIM in the beacon frame 1201 may act as a trigger for the first, second, and third STAs 120a-c to concurrently transmit BU requests 1202a, 1202b, and 1202c, respectively at time 1291. Each of the STAs 120a-c may transmit their BU requests using 20 MHz or less of the entire 80 MHz bandwidth. The implicit schedule may indicate a second time slot starting at time 1292 during which the fourth, fifth, and sixth STAs 120d, 120m, and 120x are scheduled to concurrently transmit their respective BU requests 1203a, 1203b, and 1203c. As described above, the BU requests may also be triggered by other DL frames.

FIG. 13 is a time sequence diagram 1300 of a buffered unit request procedure utilizing UL MU MIMO/UL FDMA and including both PS-Poll frames and APSD frames. The BU procedure of FIG. 13 may be performed in the MIMO system 100 described above. In this procedure, the AP 110 may transmit a beacon 1301 including a TIM field and a CTX element. The TIM may indicate that the AP 110 has buffered data to send to the first STA 120a, the second STA 120b, the third STA 120c, and the fourth STA 120d. The beacon 1301 may provide UL MU MIMO or UL FDMA parameters for the STAs 120 that are indicated in the TIM field as having DL data pending at the AP 110. In this procedure, the CTX may indicate that the first STA 120a and the second STA 120b are clear to transmit BU requests. In response to receiving the CTX from the AP 110, the first STA 120a may send an APSD frame 1302a using the UL MU MIMO/UL FDMA parameters provided in the CTX. The APSD frame 1302a requests the AP 110 to transmit buffered data to the first STA 120a. In response to receiving the CTX from the AP 110, the second STA 120b may transmit a PS-Poll frame 1302b to the AP 110 to request buffered data using the UL MU MIMO/UL FDMA parameters provided in the CTX. The APSD frame 1302a and the PS-Poll frame 1302b may be transmitted concurrently, on different streams or channels, according to the parameters provided in the CTX. In this procedure, the beacon 1301 including the CTX element acts as a trigger for the first STA 120a to send the APSD frame 1302a and for the second STA 120b to send the PS-Poll frame 1302b. The AP 110 may respond to the APSD frame 1302a and the PS-Poll frame 1302b by sending an ACK frame 1303 to the first and second STAs 120a and 120b either in DL MU MUMO, DL FMDA, or as a multicast ACK frame.

The APSD frame 1302a may comprise a data frame having an Access Category (AC) indicating that the first STA 120a is awake and is requesting to receive the data buffered at the AP 110 for the first STA 120a. In general, the AC of a frame indicates the priority of the data to ensure quality of service. Access categories may include, for example, best effort (AC_BE), background (AC_BG), video (AC_VI), and voice (AC_VO) categories. In an APSD procedure, a data frame sent from an STA 120 to an AP 110 may have a specific access category set to act as a BU request. A beacon or a CTX may include an indication of which ACs indicate a BU request, and therefore act as a trigger to receive buffered data from the AP 110.

As described above, the AP 110 may also have data buffered to send to the third STA 120c and the fourth STA 120d. The AP 110 may use the ACK frame 1303 to trigger a set of UL MU MIMO or UL FMDA BU requests from the third and fourth STAs 120. For example, the AP 110 may include a CTX element in the ACK frame 1303. The CTX element in the ACK frame 1303 may clear the third and fourth STAs 120c and 120d to transmit. The UL MU MIMO/UL FDMA parameters for the third and fourth STAs 120c and 120d may have been previously defined in the beacon 1301 as described above. Alternatively, the ACK frame 1503 including the CTX field may further include the required parameters for MU MIMO or FDMA transmissions. In response to receiving the ACK frame 1303 including the CTX field, the third STA 120c may transmit a PS-Poll frame 1304a to the AP 110 concurrently with the fourth STA 120d transmitting the APSD frame 1304b to the AP 110 using UL MU MIMO/UL FDMA. In response to receiving the APSD frame 1302a, the PS-Poll frame 1302b, the PS-Poll frame 1304a, and the APSD frame 1304b from the first, second, third, and fourth STAs 120a-d, respectively, the AP 110 may determine that the STAs 120a-d are awake. The AP 110 may send downlink data to the STAs 120a-d. For example, the AP 110 may respond to each of the frames 1302a, 1302b, 1304a, and 1304b from the first, second, third, and fourth STAs 120a-d directly with data frames 1305. The AP 110 may send the data frames 1305 to each STA 120a-d using either DL single-user (SU) or MU transmissions. As shown in FIG. 13, both PS-Polls and APSD frames may act as a BU request for the AP 110 to transmit buffered data to a STA. Also, both the beacon 1301 and the DL ACK frame 1303 sent by the AP 110 may serve as a trigger for a UL MU MIMO/UL FDMA transmission for particular stations.

FIG. 14 is a time sequence diagram 1400 of an automatic power save delivery procedure utilizing UL MU MIMO/UL FDMA. The APSD procedure of FIG. 14 may be performed in the MIMO system 100 described above. In this procedure, the AP 110 may transmit a beacon frame 1401 including a TIM field. The TIM may indicate that the AP 110 has buffered data to send to the first STA 120a and the second STA 120b. The AP 110 may send a CTX frame 1402 providing UL MU MIMO or UL FDMA parameters for the STAs 120a and 120b indicated in the TIM. In certain implementations, the beacon frame 1401 includes an information element (IE) indicating when the AP 110 will send the CTX frame 1402. STAs 120 indicated by the TIM to have buffered data at the AP 110 will read the IE and wait for the time indicated in the beacon frame 1401 to receive the CTX frame 1402. The CTX frame 1402 may indicate that the first STA 120*a* and the second STA 120*b* are clear to transmit BU requests to the AP 110. In response to receiving the CTX frame 1402 from the AP 110, the first STA 120*a* may transmit an APSD frame 1403*a* to request buffered data from the AP 110 using the UL MU MIMO/UL FDMA parameters provided in the CTX frame 1402. In response to receiving the CTX frame 1402 from the AP 110, the second STA 120*b* may transmit an APSD frame 1403*b* to request buffered data from the AP 110 using the UL MU MIMO/UL FDMA parameters provided in the CTX frame 1402. As shown in FIG. 14, the APSD frames 1403*a* and 1403*b* may be transmitted concurrently, on different streams or channels, according to the parameters provided in the CTX frame 1402. In this procedure, the CTX frame 1402 acts as a trigger for the first STA 120*a* and the second STA 120*b* to send their APSD frames 1403*a* and 1403*b*.

Optionally, the AP 110 may respond to the APSD frames 1403*a* and 1403*b* by sending an ACK frame 1404 to the first and second STAs 120*a* and 120*b* either in DL MU MUMO, DL FMDA, or as a multicast ACK frame. The ACK frame 1404 may acknowledge receipt of the APSD frames 1403*a* and 1403*b*. In some embodiments, the STAs 120*a* and 120*b* are configured to perform contention for transmission of their BU request (e.g., an APSD frame). The STAs 120*a* and 120*b* may be configured to abort the contention process upon receipt of the ACK frame 1404 from the AP 110. If the AP 110 responds with the ACK frame 1404, the AP 110 may send the buffered data at a later time. In some embodiments, the AP 110 may not send the ACK frame 1404 and may instead send the buffered data in response to receiving the APSD frames 1403*a* and 1403*b*.

The APSD frames 1403*a* and 1403*b* may each comprise a data frame having a specific AC, as described above, indicating that the sending STA 120 is awake and is requesting to receive buffered data from the AP 110. The AC of the buffered data may be indicated in the CTX frame 1402. Accordingly, each STA 120 may determine which AC to use for a data frame in order to perform the APSD procedures described above.

In some embodiments, the CTX frame 1402 allocates resources (e.g., channels or streams) for each STA 120. The CTX frame 1402 may allocate certain resources to certain STAs 120. However, in some circumstances, a STA 120 may be sleeping and may not use the resource allocated to it, thereby wasting the resource and decreasing network efficiency. In some embodiments, the CTX frame 1402 may allocate random access resources (e.g., channels or streams) for the STAs 120. The random access recourse may be accessed by a subset or all of the STAs 120 indicated in the CTX frame 1402. Multiple STAs 120 may transmit on a same random access resource, which may cause collision of the transmissions. A contention resolution protocol may be used to reduce the collision probability among the multiple STAs 120 that transmit on the same random access resource.

In response to receiving the APSD frames 1403*a* and 1403*b*, the AP 110 transmits the first SU or MU data 1405 (e.g., the buffered data). The STAs 120*a* and 120*b* may respond to the first SU or MU data 1405 by transmitting an ACK frame 1406. In some embodiments, the CTX frame 1402 may indicate which type of UL frames from each STA 120 will be processed as BU requests. For example, the CTX frame 1402 may indicate that PS-Poll, or APSD frames, or both, will be processed as a BU request. The CTX frame 1402 may also indicate which types of UL frames will be processed as a BU request on a per-station basis.

The APSD procedure described above may provide advantages over PS-Poll procedures. For example, in PS-Poll procedures, the AP 110 may transmit one Media Access Control (MAC) protocol data unit (MPDU) in response to receiving one PS-Poll. In APSD procedures, the AP 110 may send multiple MPDUs while the STA 120 is awake, up to a maximum number, in response to receiving one APSD frame. The AP 110 may indicate the end of the data transmission by setting the End of Service Period (EoSP) bit in the last MPDU. As shown in FIG. 14, the AP 110 may transmit a second SU or MU data 1407 to the STAs 120*a* and 120*b*. The second SU or MU data 1407 may have the EoSP bit set. The AP 110 may send such SU data or MU data irrespective of how the BU requests are received (e.g., concurrently or not). In response to receiving the second SU or MU data 1407, the STAs 120*a* and 120*b* may transmit ACK 1408.

Figure 15:
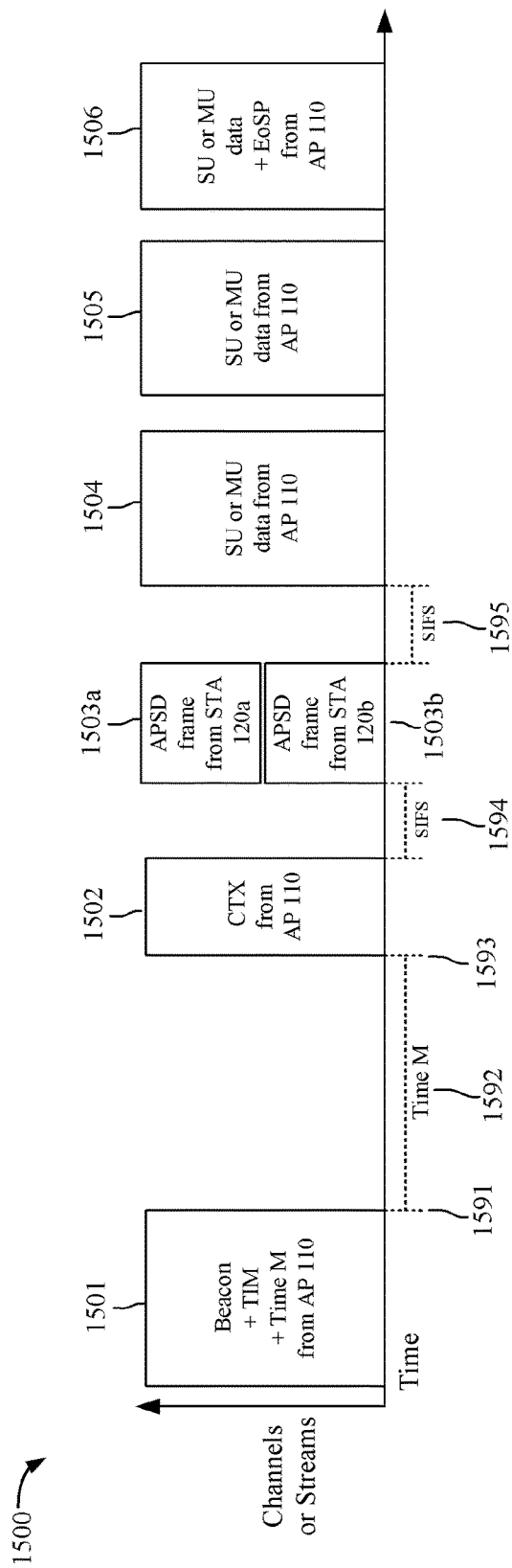
FIG. 15 is a time sequence diagram of an automatic power save delivery procedure utilizing UL MU MIMO/UL FDMA and including an offset clear-to-transmit frame (CTX).

FIG. 15 is a time sequence diagram 1500 of an automatic power save delivery procedure utilizing UL MU MIMO/UL FDMA and including an offset CTX. The APSD procedure of FIG. 15 may be performed in the MIMO system 100 described above. In this procedure, the AP 110 may transmit a beacon frame 1501 including a TIM field. The TIM may indicate that the AP 110 has buffered data to send to the first STA 120*a* and the second STA 120*b*. The beacon frame 1501 may also indicate an amount of time M 1592 after transmission of the beacon frame 1501 during which the AP 110 may not send a CTX frame 1502. In certain implementations, the beacon frame 1501 includes an information element (IE) indicating when the AP 110 will send the CTX frame 1502. STAs 120 indicated by the TIM to have buffered data at the AP 110 will read the IE and wait for the time indicated in the beacon frame 1501 to receive the CTX frame 1502. At time 1591, after receiving the beacon frame 1501, the STAs 120*a* and 120*b* may enter sleep mode. The STAs 120*a* and 120*b* may remain in the sleep mode for a length of time M 1592. After the length of time M 1592, the STAs 120*a* and 120*b* may wake up at time 1593 in order to receive the CTX frame 1502 transmitted by the AP 110.

The CTX frame 1502 may provide UL MU MIMO or UL FDMA parameters for the STAs 120*a* and 120*b* and may indicate that the STAs 120*a* and 120*b* are clear to transmit BU requests (e.g., APSD frames). In response to receiving the CTX frame 1502 from the AP 110 and after a short interframe space (SIFS) 1594, the first STA 120*a* may transmit an APSD frame 1503*a* to request buffered data from the AP 110 using the UL MU MIMO/UL FDMA parameters provided in the CTX frame 1502. The second STA 120*b* may concurrently transmit, on different streams or channels, an APSD frame 1403*b* to request buffered data from the AP 110 using the UL MU MIMO/UL FDMA parameters provided in the CTX frame 1502. In this procedure, the CTX frame 1502 acts as a trigger for the first STA 120*a* and the second STA 120*b* to send their APSD frames 1503*a* and 1503*b*.

In response to receiving the APSD frames 1503*a* and 1503*b*, the AP 110 may transmit first SU or MU data 1504 to the STAs 120*a* and 120*b* after a SIFS 1595. The AP 110 may have further data buffered to transmit to the STAs 120*a* and 120*b*. Accordingly, the AP 110 may transmit second SU or MU data 1505 and third SU or MU data 1506 to the STAs 120*a* and 120*b*. The third SU or MU data 1506 may have the EoSP bit set indicating that it is the last buffered frame. As described above, the APSD procedures allow for the AP 110 to transmit more than one data frame in response to receiving an APSD frame from an STA 120.

Figure 16:
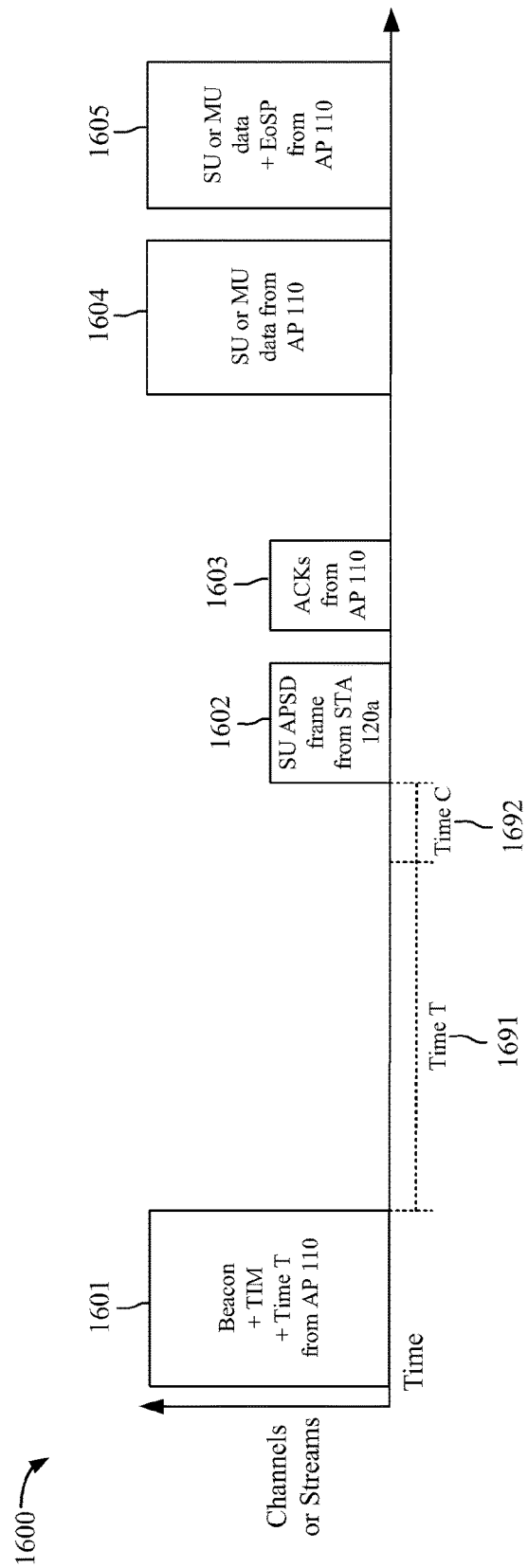
FIG. 16 is a time sequence diagram of an automatic power save delivery procedure utilizing contention for transmission of an automatic power save delivery frame.

FIG. 16 is a time sequence diagram 1600 of an automatic power save delivery procedure utilizing contention for transmission of an automatic power save delivery frame. The APSD procedure of FIG. 16 may be performed in the MIMO system 100 described above. In this procedure, the AP 110 may transmit a beacon 1601 including a TIM field. The TIM may indicate that the AP 110 has buffered data to send to the first STA 120a. In some embodiments, the STAs 120 and AP 110 may negotiate an interval of time T 1691 during which a CTX should be sent. The beacon 1601 may indicate the amount of Time T 1691. Setting the time interval for the CTX using the amount of Time T 1691 may provide advantages where the STAs 120 are not allowed to contend for the transmission of BU requests because an STA 120 may have traffic requiring a bounded latency (e.g., the traffic is received at a regular interval). The STAs 120 may be forbidden from performing contention to transmit a PS-Poll, an APSD frame, or another BU request during the Time T 1691.

As shown in FIG. 16, the AP 110 may not transmit a CTX frame to the first STA 120a within the time T 1691. In response to not receiving the CTX frame during the time T 1694, the first STA 120a may perform contention during Time C 1692 in order to transmit a SU APSD frame 1602. In some embodiment, the first STA 120a may also be configured to perform contention to transmit the SU APSD frame 1602, or another BU request, in response to not receiving an ACK from the AP 110 after transmitting an APSD frame in response to a CTX. In some embodiments, BU request frames (e.g., PS-Polls or APSD frames) may be aggregated with other information that the STA 120 has for transmission to the AP 110. This may allow for more efficient signaling compared to a separate transmission of additional information. The additional information may include buffer status information, a request for a transmission opportunity (TXOP) for UL transmission, or a request for the AP 110 to provide beacon updated management information along with the Data, for example. Aggregating the request for a TXOP may provide advantages in terms of overhead and contention reduction. Moreover, in certain operation modes, STAs 120 may not be allowed to contend and access the medium autonomously, and may have to wait to receive a CTX from the AP 110 before sending any UL signaling. Aggregating other information with the BU request allows for a more efficient operation. An APSD data frame may be aggregated in an A-MPDU with other MPDUs, such as data, control or management MPDUs.

In response to receiving the SU APSD frame 1602, the AP 110 may transmit ACK frame 1603 to the first STA 120a. In response to receiving the SU APSD frame 1602, the AP 110 may also transmit an indication of a scheduled transmission time and a transmission opportunity for the buffered data. Accordingly, the first STA 120a may be configured to sleep until the scheduled time. The AP 110 may provide the indication of the scheduled transmission time to other STAs 120 that are scheduled to receive buffered data in the same transmission opportunity (e.g., through DL MU MIMO or DL OFDMA transmissions). The AP 110 may also indicate restrictions on the access category of UL data the STAs 120 may send during the transmission opportunity.

In the embodiments described above with reference to FIGS. 5-16, the BU request frame may be substituted by other types of frames. For example, a quality of service null frame, a data frame, a management frame, a control frame, or any other frame may be provided to indicate to AP 110 that the STA 120 is awake.

Figure 17:
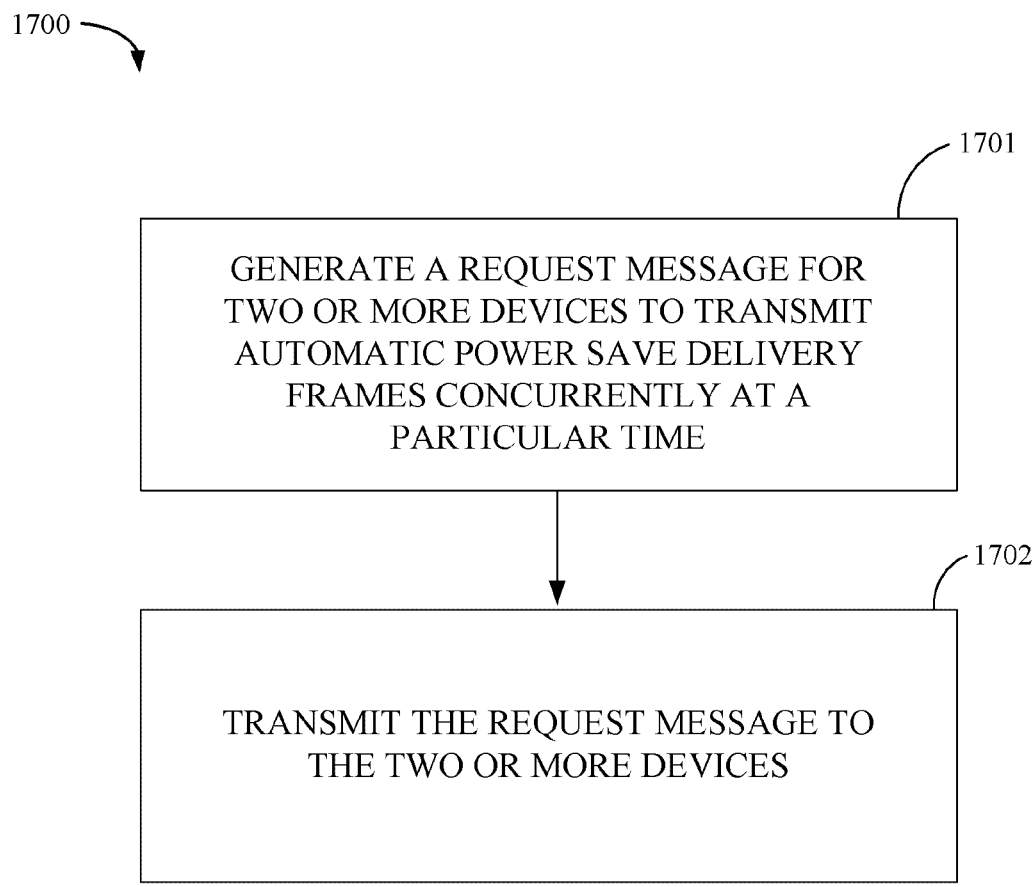
FIG. 17 is a flowchart of an exemplary method for providing wireless communication utilizing UL MU MIMO/UL FDMA.

FIG. 17 is a flow chart illustrating an exemplary method 1700 for providing wireless communication. The method 1700 may be implemented in the MIMO system 100 described above. In some aspects, the method 1700 may be implemented by the AP 110 of FIG. 1 or the wireless device 302 of FIG. 3. At block 1701, the AP 110, for example, may generate a request message for two or more devices to transmit automatic power save delivery frames concurrently at a specified time. In an aspects, the two or more devices may comprise the STAs 120 of FIG. 1 or the wireless device 302 of FIG. 3. In various embodiments, the request message may comprise at least one of a beacon frame, an acknowledgement frame, and a clear-to-transmit frame. At block 1702, the AP 110, for example, may transmit the request message to the two or more devices.

Additionally or alternatively, as part of method 1700, the AP 110, for example, may receive at least a first portion of a first frame of the APSD frames during a first time period and at least a second portion of a second frame of the APSD frames during a second time period, wherein the first time period and the second time period overlap. Additionally or alternatively, as part of method 1700, the AP 110, for example, may receive the APSD frames from the two or more devices according to a schedule for each of the two or more devices to transmit the APSD frames, wherein the request message includes the schedule. Additionally or alternatively, as part of method 1700, the AP 110, for example, may receive the APSD frames from the two or more devices each having an indicated access category, wherein the request message indicates the access category for transmission of at least one of the APSD frames from each of the two or more devices. Additionally or alternatively, as part of method 1700, the AP 110, for example, may receive the APSD frames from the two or more devices via at least one of uplink multi-user MIMO and uplink FDMA transmissions. Additionally or alternatively, as part of method 1700, the AP 110, for example, may receive the APSD frames from the two or more devices, generate at least one data message comprising single-user or multi-user data in response to receiving the APSD frames, and/or transmit the at least one data message to the two or more devices.

In some aspects, the request message comprises a beacon frame, and the AP 110, for example, may transmit a clear-to-transmit frame after transmitting the beacon frame, the beacon frame comprising an information element (IE) indicating when the clear-to-transmit frame will be transmitted to the two or more devices. In various aspects, the request message comprises a beacon frame, and the AP 110, for example, transmits a clear-to-transmit frame after transmitting the beacon frame, the beacon frame indicating a time M during which the clear-to-transmit frame will not be transmitted to the two or more devices. In various embodiments, the request message comprises a beacon frame, and the AP 110, for example, transmits a clear-to-transmit frame after transmitting the beacon frame, the beacon frame indicating a first time M during which the clear-to-transmit frame will not be transmitted to the two or more devices and a second time C during which the two or more devices may perform contention after the first time M.

In order to perform and implement the various procedures and embodiments described above, an apparatus for wireless communication may be provided. The apparatus may include means for transmitting a message to two or more stations, the message requesting the two or more stations to transmit power save polls concurrently at a particular time. The apparatus may further include means for concurrently receiving the power save polls from each of the stations. The apparatus may further include means for receiving the APSD frames, or at least a portion thereof. The apparatus can also include means for generating at least one data message comprising single-user or multi-user data, and means for transmitting the same.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: A, B, or C" is intended to cover: A or B or C or A and B or A and C or B and C or A, B, and C or 2A or 2B or 2C and so on.

The various operations of methods described above may be performed by any suitable means capable of performing the operations, such as various hardware and/or software component(s), circuits, and/or module(s). For example, the various means for generating may comprise one or more of the processor 304, the memory 306, the signal detector 318, or the DSP 320 or FIG. 3, or equivalents thereof. The various means for receiving may comprise one or more of the processor 304, the signal detector 318, the DSP 320, the receiver 312, or the transceiver 314 or FIG. 3, or equivalents thereof. Further, the various means for transmitting may comprise one or more of the processor 304, the signal detector 318, the DSP 320, the transmitter 310, or the transceiver 314 or FIG. 3, or equivalents thereof. Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a station and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a station and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication comprising:
   a processing system configured to generate a request message for transmission from the apparatus to two or more devices, the request message requesting that the two or more devices transmit, to the apparatus, automatic power save delivery frames (APSD frames) concurrently at a particular time; and
   a first interface for outputting the request message for transmission, from the apparatus, to the two or more devices.

2. The apparatus of claim 1, further comprising a second interface for receiving at least a first portion of a first frame of the APSD frames during a first time period and at least a second portion of a second frame of the APSD frames during a second time period, wherein the first time period and the second time period overlap.

3. The apparatus of claim 1, further comprising:
   a second interface for receiving the APSD frames, wherein the request message includes a schedule for each of the two or more devices to transmit at least one of the APSD frames, and wherein the processing system is further configured to concurrently receive the APSD frames according to the schedule via the second interface.

4. The apparatus of claim 1, further comprising:
   a second interface for receiving the APSD frames from the two or more devices, wherein the request message indicates an access category for transmission of each of the APSD frames from each of the two or more devices, and wherein the processing system is further configured to receive the APSD frames having the indicated access category via the second interface.

5. The apparatus of claim 1, wherein the request message comprises at least one of a beacon frame, an acknowledgement frame, or a clear-to-transmit frame.

6. The apparatus of claim 1, further comprising:
   a second interface for receiving the APSD frames from the two or more devices via at least one of a multi-user MIMO transmission or a multi-user FDMA transmission, and wherein the processing system is further configured to receive the APSD frames via the second interface.

7. The apparatus of claim 1, further comprising:
   a second interface for receiving the APSD frames from the two or more devices, wherein the processing system is further configured to:
   receive the APSD frames via the second interface,
   generate at least one data message comprising single-user or multi-user data in response to receiving the APSD frames, and
   provide the at least one data message to the first interface for transmission to the two or more devices.

8. The apparatus of claim 1, wherein the request message comprises a beacon frame, and wherein the first interface is configured to output a clear-to-transmit frame after outputting the beacon frame, the beacon frame comprising an information element (IE) indicating when the first interface will transmit the clear-to-transmit frame to the two or more devices.

9. The apparatus of claim 1, wherein the request message comprises a beacon frame, and wherein the first interface is configured to output a clear-to-transmit frame after outputting the beacon frame, the beacon frame indicating a time M during which the first interface will not transmit the clear-to-transmit frame to the two or more devices.

10. The apparatus of claim 1, wherein the request message comprises a beacon frame, the beacon frame indicating a first time M during which the first interface will not transmit a clear-to-transmit frame to the two or more devices and a second time C during which the two or more devices may perform contention after the first time M.

11. A method for wireless communication, comprising:
    generating a request message for transmission, from an access point to two or more devices, the request message requesting that the two or more devices transmit to the access point, automatic power save delivery frames (APSD frames) concurrently at a particular time; and
    transmitting the request message, from the access point, to the two or more devices.

12. The method of claim 11, further comprising:
    receiving at least a first portion of a first frame of the APSD frames during a first time period and at least a second portion of a second frame of the APSD frames during a second time period, wherein the first time period and the second time period overlap.

13. The method of claim 11, further comprising:
    receiving the APSD frames from the two or more devices according to a schedule for each of the two or more devices to transmit the APSD frames, wherein the request message includes the schedule.

14. The method of claim 11, further comprising:
    receiving the APSD frames from the two or more devices each having an access category, wherein the request message indicates the access category for transmission of at least one of the APSD frames from each of the two or more devices.

15. The method of claim 11, wherein the request message comprises at least one of a beacon frame, an acknowledgement frame, and a clear-to-transmit frame.

16. The method of claim 11, further comprising:
    receiving the APSD frames from the two or more devices via at least one of uplink multi-user MIMO and uplink FDMA transmissions.

17. The method of claim 11, further comprising:
    receiving the APSD frames from the two or more devices; and
    generating at least one data message comprising single-user or multi-user data in response to receiving the APSD frames; and
    transmitting the at least one data message to the two or more devices.

18. The method of claim 11, wherein the request message comprises a beacon frame, and further comprising transmitting a clear-to-transmit frame after transmitting the beacon frame, the beacon frame comprising an information element (IE) indicating when the clear-to-transmit frame will be transmitted to the two or more devices.

19. The method of claim 11, wherein the request message comprises a beacon frame, and further comprising transmitting a clear-to-transmit frame after transmitting the beacon frame, the beacon frame indicating a time M during which the clear-to-transmit frame will not be transmitted to the two or more devices.

20. The method of claim 11, wherein the request message comprises a beacon frame, and further comprising transmitting a clear-to-transmit frame after transmitting the beacon frame, the beacon frame indicating a first time M during which the clear-to-transmit frame will not be transmitted to the two or more devices and a second time C during which the two or more devices may perform contention after the first time M.

21. An apparatus for wireless communication comprising:
means for generating a request message for transmission from the apparatus to two or more devices, the request message requesting that the two or more devices transmit, to the apparatus, automatic power save delivery frames (APSD frames) concurrently at a particular time; and
means for transmitting the request message, from the apparatus, to the two or more devices.

22. The apparatus of claim 21, further comprising:
means for receiving at least a first portion of a first frame of the APSD frames during a first time period and at least a second portion of a second frame of the APSD frames during a second time period, wherein the first time period and the second time period overlap.

23. The apparatus of claim 21, further comprising:
means for receiving the APSD frames from the two or more devices according to a schedule for each of the two or more device to transmit at least one of the APSD frames, wherein the request message includes the schedule.

24. The apparatus of claim 21, further comprising:
means for receiving the APSD frames from the two or more devices each having an access category, wherein the request message indicates the access category for transmission of each of the APSD frames from each of the two or more devices.

25. The apparatus of claim 21, wherein the request message comprises at least one of a beacon frame, an acknowledgement frame, or a clear-to-transmit frame.

26. The apparatus of claim 21, further comprising:
means for receiving the APSD frames from the two or more devices via at least one of uplink multi-user MIMO or uplink FDMA transmissions.

27. The apparatus of claim 21, further comprising:
means for receiving the APSD frames from the two or more devices; and
means for generating at least one data message comprising single-user or multi-user data in response to receiving the APSD frames; and
means for transmitting the at least one data message to the two or more devices.

28. The apparatus of claim 21, wherein the generating means comprises a processing system and the transmitting means comprises a transmitter circuit.

29. The apparatus of claim 21, wherein the request message comprises a beacon frame, and wherein the transmitting means is further configured to transmit a clear-to-transmit frame after transmitting the beacon frame, the beacon frame comprising an information element (IE) indicating when the clear-to-transmit frame will be transmitted to the two or more devices.

30. The apparatus of claim 21, wherein the request message comprises a beacon frame, and wherein the transmitting means is further configured to transmit a clear-to-transmit frame after transmitting the beacon frame, the beacon frame indicating a time M during which the clear-to-transmit frame will not be transmitted to the two or more devices.

31. The apparatus of claim 21, wherein the request message comprises a beacon frame, and wherein the transmitting means is further configured to transmit a clear-to-transmit frame after transmitting the beacon frame, the beacon frame indicating a first time M during which the clear-to-transmit frame will not be transmitted to the two or more devices and a second time C during which the two or more devices may perform contention after the first time M.

32. A non-transitory computer readable storage medium comprising instructions that when executed cause an apparatus to perform a method of wireless communication, the method comprising:
generating a request message for transmission from the apparatus to two or more devices, the request message requesting that the two or more devices transmit, to the apparatus, automatic power save delivery frames (APSD frames) concurrently at a particular time; and
transmitting the request message, from the apparatus, to the two or more devices.

* * * * *